(12) United States Patent
Bhadra et al.

(10) Patent No.: US 11,945,721 B2
(45) Date of Patent: Apr. 2, 2024

(54) METHOD FOR PRODUCING HIGH PURITY HYDROGEN

(71) Applicant: Air Products and Chemicals, Inc., Allentown, PA (US)

(72) Inventors: Shubhra Jyoti Bhadra, Macungie, PA (US); Jeffrey R. Hufton, Fogelsville, PA (US); Timothy C. Golden, Nevez (FR); Aaron Raymond Scott, Allentown, PA (US); Quan Min Shao, Allentown, PA (US); Vishrut Garg, Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 177 days.

(21) Appl. No.: 17/666,633

(22) Filed: Feb. 8, 2022

(65) Prior Publication Data
US 2023/0249971 A1 Aug. 10, 2023

(51) Int. Cl.
*C01B 3/56* (2006.01)
*B01D 53/04* (2006.01)
(Continued)

(52) U.S. Cl.
CPC ............ *C01B 3/56* (2013.01); *B01D 53/0462* (2013.01); *B01D 53/047* (2013.01); *B01J 20/3458* (2013.01); *C01B 3/506* (2013.01); *B01D 2256/16* (2013.01); *B01D 2257/102* (2013.01); *B01D 2257/104* (2013.01); *B01D 2257/11* (2013.01); *B01D 2257/502* (2013.01);
(Continued)

(58) Field of Classification Search
CPC ..... C01B 3/56; C01B 3/506; C01B 2203/042; B01D 53/0462; B01D 53/047; B01D 2256/16; B01D 2257/102; B01D 2257/104; B01D 2257/11; B01D 2257/502; B01D 2257/504; B01D 2257/7025; B01D 2257/80; B01J 20/3458
See application file for complete search history.

(56) References Cited

U.S. PATENT DOCUMENTS

| 2,975,605 A | 3/1961 | Haringhuizen et al. |
| 3,011,589 A | 12/1961 | Meyer et al. |
| 3,398,506 A * | 8/1968 | Baldus ............... F25J 3/0655 95/143 |

(Continued)

FOREIGN PATENT DOCUMENTS

| CN | 103743195 A | 4/2014 |
| CN | 103848398 A | 8/2015 |

(Continued)

OTHER PUBLICATIONS

International Search Report; PCT/US2023/012178; Method for Producing High Purity Hydrogen; dated Jun. 19, 2023; 11 pgs.
(Continued)

*Primary Examiner* — Youngsul Jeong
(74) *Attorney, Agent, or Firm* — Jason M. Ploeger

(57) ABSTRACT

A hydrogen feed stream comprising oxygen and one or more impurities selected from the group consisting of nitrogen, argon, methane, carbon monoxide, carbon dioxide, and water, is purified using a cryogenic temperature swing adsorption (CTSA) process with high overall recovery of hydrogen. The CTSA is regenerated using an inert gas to prevent an explosive mixture of hydrogen and oxygen from occurring.

6 Claims, 32 Drawing Sheets

(51) Int. Cl.
  *B01D 53/047* (2006.01)
  *B01J 20/34* (2006.01)
  *C01B 3/50* (2006.01)

(52) U.S. Cl.
  CPC ............... *B01D 2257/504* (2013.01); *B01D 2257/7025* (2013.01); *B01D 2257/80* (2013.01); *C01B 2203/042* (2013.01)

(56) References Cited

U.S. PATENT DOCUMENTS

| | | | | |
|---|---|---|---|---|
| 3,691,779 | A | * | 9/1972 | Meisler ............... F25J 3/0655 62/638 |
| 3,838,553 | A | * | 10/1974 | Doherty ............... C01B 23/00 95/143 |
| 5,836,172 | A | | 11/1998 | Gary et al. |
| 5,955,214 | A | * | 9/1999 | Bellows ............... B01D 53/04 429/412 |
| 6,083,301 | A | | 7/2000 | Gary et al. |
| 2002/0110504 | A1 | * | 8/2002 | Gittleman ........... H01M 8/0662 423/247 |
| 2005/0120877 | A1 | * | 6/2005 | Wu ......................... C01C 1/024 95/117 |
| 2019/0275460 | A1 | | 9/2019 | Zhong et al. |
| 2019/0366589 | A1 | | 12/2019 | Aliperta et al. |
| 2020/0355428 | A1 | * | 11/2020 | Coleman ................ F25J 3/0223 |

FOREIGN PATENT DOCUMENTS

| | | |
|---|---|---|
| CN | 107364832 A | 11/2017 |
| GB | 291409 A | 10/1929 |
| WO | 2019025690 A1 | 7/2019 |

OTHER PUBLICATIONS

International Search Report; PCT/US2023/012188; Method for Producing High Purity Hydrogen; dated Jun. 19, 2023; 12 pgs.

* cited by examiner

METHOD FOR PRODUCING HIGH PURITY HYDROGEN

BACKGROUND

The present invention provides systems and methods for producing high purity hydrogen. High purity hydrogen is defined as a hydrogen stream with a total impurity concentration less than 1 part per million (ppm) by volume, or less than 100 parts per billion (ppb), or less than 1 ppb. All concentrations are on a volume basis unless otherwise stated. In this disclosure a pure hydrogen stream is defined as the product of a single purification step on a hydrogen-containing feed stream. An ultra-pure hydrogen stream is defined as the product of a single purification step on a pure hydrogen stream. Although by definition an ultra-pure hydrogen stream has a lower concentration of impurities than the pure hydrogen stream it was derived from, both pure hydrogen streams and ultra-pure hydrogen streams are high purity hydrogen as defined herein. It may be possible for a pure hydrogen stream from one process to have a lower concentration of impurities than an ultra-pure hydrogen stream from a different process.

Industrial hydrogen production typically requires the use of pressure swing adsorption (PSA) processes to upgrade a crude hydrogen stream with a hydrogen concentration of about 60-90%. Historically the source of crude hydrogen would be from steam methane reforming (SMR) of natural gas or the refinery off-gas (ROG) from oil refineries, but electrolysis of water or SMR of biomass are also possible carbon-neutral sources. The hydrogen product stream purity from PSA processes is typically from 10 ppm to 2% impurities.

This level of purity suffices for most applications such as crude oil upgrading reactions (e.g. hydrocracking) or synthesis of chemicals such as methanol or ammonia. However, some applications, especially electronics manufacturing, require high purity hydrogen that PSA processes are not able to deliver. High purity hydrogen is typically produced by vaporization of liquid hydrogen or by cryogenic temperature swing adsorption (CTSA) process. Liquid hydrogen supply entails challenging logistics and high costs. The CTSA process requires costly equipment and operation to maintain cryogenic temperature and uses a large amount of regeneration gas.

Haringhuizen et al. (U.S. Pat. No. 2,975,605) teach a process for the purification of hydrogen, in which residual amounts of impurities such as nitrogen, carbon monoxide or argon are deposited in the solid form in a cryogenic heat exchanger. The cryogenic heat exchanger is regenerated by flowing pure hydrogen in the reverse direction to evaporate and remove the impurities.

Baldus (U.S. Pat. No. 3,398,506) teaches a hydrogen purification method that first compresses the crude hydrogen stream to condense any impurities with boiling points above about 153 K, then passes the resulting hydrogen stream through a first CTSA at 90 K and a second CTSA at 35-45 K. The first CTSA is regenerated at a temperature below 220 K, preferably below 180 K, to maximize the thermal efficiency of the process.

Gary et al. (WO 2019/025690) teach a two-stage hydrogen purification method using a PSA followed by a TSA process in which a hydrogen stream containing trace carbon monoxide is passed through an active material comprising nickel and/or copper to reduce the carbon monoxide concentration of the hydrogen product to less than 1 ppm. The TSA process removes carbon monoxide via chemisorption in which carbon monoxide forms a chemical bond with the material surface, as opposed to physisorption in which impurities adsorb to the material surface by weaker van der Waals forces. The adsorbent is regenerated through heating at temperatures above 423 K.

Wei et al. (CN 101648698) teach a hydrogen purification method to produce hydrogen with less than 1 ppm impurities using a PSA, followed by catalytic deoxygenation to consume trace oxygen impurities, and finally a CTSA operating at about 88 K and regenerated at about 233 K.

Existing technology for the production of high purity hydrogen relies on deposition of impurities as a solid, chemisorbed species, or adsorbed species at cryogenic temperatures, typically below 80 K. Cycling between a lower-temperature purification phase and a higher-temperature regeneration phase is costly in terms of energy and regeneration gas requirement. The regeneration gas once spent must be recycled and reprocessed. There exists a need for a more efficient process to provide high purity hydrogen, preferably one that can be integrated with upstream PSA processes.

SUMMARY

This invention relates to a process to produce a high purity hydrogen stream from a hydrogen feed stream comprising hydrogen and one or more impurities selected from the group consisting of nitrogen, argon, methane, carbon monoxide, carbon dioxide, oxygen, and water. An initial upgrading step may first be performed using a PSA. High purity hydrogen is then produced using a cryogenic temperature swing adsorption (CTSA) process or a cryogenic wash column (CWC) liquid hydrogen scrubbing process in a suitable gas-liquid contactor or a combination of the two. For a given purity specification, the invention provides a method with high recovery of hydrogen. Recycle streams from the CTSA and/or the CWC may be used to improve the performance of the PSA.

Aspect 1: A process for the purification of a hydrogen feed stream comprising hydrogen and one or more impurities selected from the group consisting of nitrogen, argon, methane, carbon monoxide, carbon dioxide, and water, the process comprising cooling the hydrogen feed stream to produce a cooled hydrogen stream; passing the cooled hydrogen stream through an online adsorber at a cryogenic temperature to adsorb the one or more impurities and produce a pure hydrogen stream and a loaded adsorber; and passing a regeneration gas stream through the loaded adsorber at a temperature between 0 and 50° C. and ambient pressure to regenerate the loaded adsorber and produce a spent regeneration gas stream enriched in the one or more impurities.

Aspect 2: A process according to Aspect 1, wherein the regeneration gas comprises at least a portion of the hydrogen feed stream.

Aspect 3: A process according to Aspect 1 or Aspect 2, wherein the regeneration gas comprises at least a portion of the pure hydrogen stream.

Aspect 4: A process according to any of Aspects 1 to 3, further comprising combining a liquid hydrogen stream with the cooled hydrogen stream prior to passing the cooled hydrogen stream through the online adsorber.

Aspect 5: A process according to any of Aspects 1 to 4, wherein the pure hydrogen stream is depleted in argon relative to the hydrogen feed stream.

Aspect 6: A process according to any of Aspects 1 to 5, further comprising separating a crude hydrogen stream by an adsorption process using a plurality of adsorbent beds to produce the hydrogen feed stream and an impurities-enriched tail gas stream; wherein the adsorption process comprises a counter-current purge step during which a purge gas is introduced to remove one or more crude impurities selected from nitrogen, argon, methane, carbon monoxide, carbon dioxide, and water, from the plurality of adsorbent beds; and wherein the purge gas comprises at least a portion of the spent regeneration gas stream.

Aspect 7: A process according to Aspect 6, further comprising separating the impurities-enriched tail gas stream to produce a hydrogen-enriched tail gas fraction and a hydrogen-depleted tail gas fraction; and combining the hydrogen-enriched tail gas fraction with one or more of the crude hydrogen stream and the hydrogen feed stream.

Aspect 8: A process according to Aspect 6 or Aspect 7, wherein the adsorption process comprises a depressurization step during which a hydrogen-rich tail gas fraction is removed from the plurality of beds; and further comprises combining the hydrogen-rich tail gas fraction with the crude hydrogen stream.

Aspect 9: A process according to Aspect 8, wherein the hydrogen content of the hydrogen-rich tail gas fraction is greater than 20% by volume.

Aspect 10: A process according to any of Aspects 1 to 9, further comprising contacting the pure hydrogen stream with a liquid hydrogen wash stream to produce an ultra-pure hydrogen stream depleted in the one or more impurities and a liquid hydrogen effluent stream enriched in the one or more impurities.

Aspect 11: A process according to Aspect 10, further comprising cooling the pure hydrogen stream prior to contacting with the liquid hydrogen wash stream; wherein the lowest temperature of the pure hydrogen stream is lower than the freezing point of the one or more impurities.

Aspect 12: A process according to Aspect 10 or Aspect 11, wherein the regeneration gas comprises at least a portion of a stream derived from the liquid hydrogen effluent stream.

Aspect 13: A process according to any of Aspects 1 to 12, further comprising cooling the pure hydrogen stream to produce a partially condensed pure hydrogen stream; separating the partially condensed pure hydrogen stream into a pure hydrogen vapor stream and a pure hydrogen liquid stream; passing the pure hydrogen liquid stream through an online liquid-phase adsorber to adsorb the one or more impurities and produce a liquid hydrogen wash stream and a loaded liquid-phase adsorber; passing a liquid-phase adsorber regeneration gas stream through the loaded liquid-phase adsorber at a temperature between 0 and 50° C. and ambient pressure to regenerate the loaded liquid-phase adsorber and produce a spent liquid-phase adsorber regeneration gas stream enriched in the one or more impurities; and contacting the pure hydrogen vapor stream with the liquid hydrogen wash stream counter-currently to produce an ultra-pure hydrogen stream depleted in the one or more impurities and a liquid hydrogen effluent stream enriched in the one or more impurities.

Aspect 14: A process according to Aspect 13, wherein the regeneration gas comprises the spent liquid-phase adsorber regeneration gas stream.

Aspect 15: A process according to Aspect 13 or Aspect 14, wherein the liquid-phase adsorber regeneration gas comprises at least a portion of the hydrogen feed stream.

Aspect 16: A process according to any of Aspects 13 to 15, wherein the liquid-phase adsorber regeneration gas comprises at least a portion of the ultra-pure hydrogen stream.

Aspect 17: A process according to any of Aspects 1 to 12, further comprising cooling the pure hydrogen stream to produce a partially condensed pure hydrogen stream; separating the partially condensed pure hydrogen stream into a pure hydrogen vapor stream and a pure hydrogen liquid stream; and purifying the pure hydrogen liquid stream to produce an ultra-pure hydrogen stream depleted in the one or more impurities and a waste stream enriched in the one or more impurities.

Aspect 18: A process according to Aspect 17, wherein the pure hydrogen liquid stream is purified by reboiling against at least a portion of the ultra-pure hydrogen stream.

Aspect 19: A process according to Aspect 17 or Aspect 18, wherein the pure hydrogen liquid stream is purified by reboiling against at least a portion of the partially condensed pure hydrogen stream.

Aspect 20: A process according to any of Aspects 17 to 19, wherein the pure hydrogen liquid stream is purified by passing the pure hydrogen liquid through a liquid phase adsorber to produce the ultra-pure hydrogen stream and a loaded liquid-phase adsorber; and passing a liquid-phase adsorber regeneration gas through the loaded liquid-phase adsorber to regenerate the loaded liquid-phase adsorber and produce a spent liquid-phase adsorber regeneration gas enriched in the one or more impurities.

Aspect 21: A process according to Aspect 20, wherein the regeneration gas comprises at least a portion of the spent liquid-phase adsorber regeneration gas.

Aspect 22: A process according to any of Aspects 13 to 21, further comprising combining the pure hydrogen vapor stream with the hydrogen feed stream.

Aspect 23: A process for the purification of a hydrogen feed stream comprising hydrogen and one or more impurities selected from the group consisting of nitrogen, argon, methane, carbon monoxide, carbon dioxide, and water, the process comprising cooling the hydrogen feed stream to produce a cooled hydrogen stream; and contacting the cooled hydrogen stream with a liquid hydrogen wash stream counter-currently to produce a pure hydrogen stream depleted in the one or more impurities and a liquid hydrogen effluent stream enriched in the one or more impurities.

Aspect 24: A process according to Aspect 23, further comprising separating a crude hydrogen stream by an adsorption process using a plurality of adsorbent beds to produce the hydrogen feed stream and an impurites-enriched tail gas stream; wherein the adsorption process comprises a counter-current purge step during which a purge gas is introduced to remove one or more crude impurities selected from nitrogen, argon, methane, carbon monoxide, carbon dioxide, and water from the plurality of adsorbent beds; and wherein the purge gas comprises a stream derived from the liquid hydrogen effluent stream.

Aspect 25: A process according to Aspect 24, wherein the adsorption process comprises a depressurization step during which a hydrogen-rich tail gas fraction is removed from the plurality of beds; and further comprising combining the hydrogen-rich tail gas fraction with the crude hydrogen stream.

Aspect 26: A process according to Aspect 25, wherein the hydrogen content of the hydrogen-rich tail gas fraction is greater than 20% by volume.

Aspect 27: A process according to any of Aspects 24 to 26, further comprising separating the impurities-enriched tail gas stream to produce a hydrogen-enriched tail gas fraction and a hydrogen-depleted tail gas fraction; and combining the hydrogen-enriched tail gas fraction with one or more of the crude hydrogen stream and the hydrogen feed stream.

Aspect 28: A process according to any of Aspects 23 to 27, further comprising cooling the hydrogen feed stream by indirect heat exchange with the liquid hydrogen effluent stream.

Aspect 29: A process according to any of Aspects 23 to 28, further comprising cooling the hydrogen feed stream by indirect heat exchange with the pure hydrogen stream.

Aspect 30: A process according to any of Aspects 23 to 29, further comprising passing the pure hydrogen stream through an online adsorber at a cryogenic temperature to adsorb the one or more impurities and produce an ultra-pure hydrogen stream and a loaded adsorber; and passing a regeneration gas stream through the loaded adsorber at ambient temperature and pressure to regenerate the loaded adsorber and produce a spent regeneration gas stream comprising the one or more impurities.

Aspect 31: A process according to Aspect 30, wherein the regeneration gas comprises at least a portion of the pure hydrogen stream.

Aspect 32: A process according to Aspect 30 or Aspect 31, wherein the regeneration gas comprises at least a portion of the ultra-pure hydrogen stream.

Aspect 33: A process according to any of Aspects 30 to 32, further comprising separating a crude hydrogen stream by an adsorption process using a plurality of adsorbent beds to produce the hydrogen feed stream and an impurities-enriched tail gas stream; wherein the adsorption process comprises a counter-current purge step during which a purge gas is introduced to remove one or more crude impurities selected from nitrogen, argon, methane, carbon monoxide, carbon dioxide, and water from the plurality of adsorbent beds; and wherein the purge gas comprises the spent regeneration gas stream.

Aspect 34: A process for the purification of a hydrogen feed stream comprising hydrogen, oxygen, and one or more impurities selected from the group consisting of nitrogen, argon, methane, carbon monoxide, carbon dioxide, and water, the process comprising cooling the hydrogen feed stream to produce a cooled hydrogen stream; passing the cooled hydrogen stream through an online adsorber at a cryogenic temperature to adsorb the one or more impurities and produce a pure hydrogen stream and a loaded adsorber; and passing an inert regeneration gas stream through the loaded adsorber at a temperature between 0 and 50° C. and pressure to regenerate the loaded adsorber and produce a spent regeneration gas stream enriched in oxygen.

Aspect 35: A process according to Aspect 34, wherein the pure hydrogen stream is depleted in argon and oxygen relative to the hydrogen feed stream.

Aspect 36: A process according to Aspect 34 or Aspect 35, further comprising combining a liquid hydrogen stream with the cooled hydrogen stream prior to passing the cooled hydrogen stream through the online adsorber.

Aspect 37: A process according to any of Aspects 34 to 36, further comprising separating a crude hydrogen stream by an adsorption process using a plurality of adsorbent beds to produce the hydrogen feed stream and an impurities-enriched hydrogen-depleted tail gas stream; wherein the adsorption process comprises a counter-current purge step during which a purge gas is introduced to remove one or more crude impurities selected from nitrogen, argon, methane, carbon monoxide, carbon dioxide, and water, from the plurality of adsorbent beds; and wherein the purge gas comprises at least a portion of the spent regeneration gas stream.

Aspect 38: A process according to Aspect 37, wherein the adsorption process comprises a depressurization step during which a hydrogen-rich tail gas fraction is removed from the plurality of beds; further comprising combining the hydrogen-rich tail gas fraction with the crude hydrogen stream.

Aspect 39: A process according to Aspect 38, wherein the hydrogen content of the hydrogen-rich tail gas stream is greater than 20% by volume.

Aspect 40: A process according to any of Aspects 37 to 39, further comprising separating the impurities-enriched tail gas stream to produce a hydrogen-enriched tail gas fraction and a hydrogen-depleted tail gas fraction; and combining the hydrogen-enriched tail gas fraction with one or more of the crude hydrogen stream and the hydrogen feed stream.

Aspect 41: A process for the purification of a hydrogen feed stream comprising hydrogen, oxygen, and one or more impurities selected from the group consisting of nitrogen, argon, methane, carbon monoxide, carbon dioxide, and water, the process comprising cooling the hydrogen feed stream to produce a cooled hydrogen stream; and contacting the cooled hydrogen stream with a liquid nitrogen wash stream counter-currently to produce a hydrogen overhead stream depleted in oxygen and a liquid hydrogen effluent stream enriched in oxygen.

Aspect 42: A process according to Aspect 41, further comprising cooling the hydrogen feed stream by indirect heat exchange with the hydrogen overhead stream.

Aspect 43: A process according to Aspect 41 or Aspect 42, further comprising cooling a warm nitrogen stream by indirect heat exchange with the hydrogen overhead stream to produce the liquid nitrogen wash stream.

Aspect 44: A process according to any of Aspects 41 to 43, further comprising combining the hydrogen overhead stream with a second nitrogen stream to produce an ammonia syngas feed stream.

Aspect 45: A process for the purification of a hydrogen feed stream comprising hydrogen, oxygen, and one or more impurities selected from the group consisting of nitrogen, argon, methane, carbon monoxide, carbon dioxide, and water, the process comprising passing the hydrogen feed stream through an online getter adsorber at a near-ambient temperature to adsorb the one or more impurities and produce a pure hydrogen stream and a loaded getter adsorber; wherein the online getter adsorber is selected from the group consisting of mixed copper oxide and manganese oxide compositions, supported copper oxides and supported manganese oxides.

Aspect 46: A process according to Aspect 45, wherein no water is formed by the passing of the hydrogen feed stream through the online getter adsorber.

Aspect 47: A process according to Aspect 45 or Aspect 46, wherein the near-ambient temperature is between 0° C. and 50° C.

Aspect 48: A process according to any of Aspects 45 to 47, wherein the mole fraction of oxygen in the hydrogen feed stream is between 500 and 2000 ppm.

Aspect 49: A process according to any of Aspects 45 to 48, wherein the mole fraction of oxygen in the pure hydrogen stream is less than 1 ppm.

Aspect 50: A process according to any of Aspects 45 to 49, further comprising passing a getter regeneration gas stream through the loaded getter adsorber at an elevated temperature to regenerate the loaded getter adsorber and produce a spent getter regeneration gas stream enriched in oxygen.

Aspect 51: A process according to Aspect 50, wherein the getter regeneration gas stream is passed through the loaded getter adsorber at a temperature between 150 and 300° C.

Aspect 52: A process according to Aspect 50 or Aspect 51, wherein the getter regeneration gas stream comprises hydrogen.

Aspect 53: A process according to any of Aspects 45 to 52, further comprising cooling the pure hydrogen stream to produce a cooled pure hydrogen stream; passing the cooled pure hydrogen stream through an online adsorber at a cryogenic temperature to adsorb the one or more impurities and produce an ultra-pure hydrogen stream and a loaded adsorber; and passing a regeneration gas stream comprising hydrogen through the loaded adsorber at a temperature between 0 and 50° C. and ambient pressure to regenerate the loaded adsorber and produce a spent regeneration gas stream comprising the one or more impurities.

Aspect 54: A process according to Aspect 53, wherein the regeneration gas comprises at least a portion of the pure hydrogen stream.

Aspect 55: A process according to Aspect 53 or Aspect 54, wherein the regeneration gas comprises at least a portion of the ultra-pure hydrogen stream.

Aspect 56: A process according to any of Aspects 34 to 40 or Aspects 45 to 52, further comprising contacting the pure hydrogen stream with a liquid hydrogen wash stream to produce an ultra-pure hydrogen stream depleted in the one or more impurities and a liquid hydrogen effluent stream enriched in the one or more impurities.

Aspect 57: A process according to Aspect 56, further comprising cooling the pure hydrogen stream prior to contacting with the liquid hydrogen wash stream; wherein the lowest temperature of the pure hydrogen stream is lower than the freezing point of the one or more impurities.

Aspect 58: A process according to any of Aspects 34 to 40 or Aspects 45 to 52, further comprising cooling the pure hydrogen stream to produce a partially condensed pure hydrogen stream; separating the partially condensed pure hydrogen stream into a pure hydrogen vapor stream and a pure hydrogen liquid stream; passing the pure hydrogen liquid stream through an online liquid-phase adsorber to adsorb the one or more impurities and produce a liquid hydrogen wash stream and a loaded liquid-phase adsorber; passing a liquid-phase adsorber regeneration gas stream through the loaded liquid-phase adsorber at a temperature between 0 and 50° C. and ambient pressure to regenerate the loaded liquid-phase adsorber and produce a spent liquid-phase adsorber regeneration gas stream enriched in the one or more impurities; and contacting the pure hydrogen vapor stream with the liquid hydrogen wash stream counter-currently to produce an ultra-pure hydrogen stream depleted in the one or more impurities and a liquid hydrogen effluent stream enriched in the one or more impurities.

Aspect 59: A process according to Aspect 58, wherein the regeneration gas comprises the spent liquid-phase adsorber regeneration gas stream.

Aspect 60: A process according to Aspect 58 or Aspect 59, wherein the liquid-phase adsorber regeneration gas comprises at least a portion of the hydrogen feed stream.

Aspect 61: A process according to any of Aspects 58 to 60, wherein the liquid-phase adsorber regeneration gas comprises at least a portion of the ultra-pure hydrogen stream.

Aspect 62: A process according to any of Aspects 34 to 40 or Aspects 45 to 52, further comprising cooling the pure hydrogen stream to produce a partially condensed pure hydrogen stream; separating the partially condensed pure hydrogen stream into a pure hydrogen vapor stream and a pure hydrogen liquid stream; and purifying the pure hydrogen liquid stream to produce an ultra-pure hydrogen stream depleted in the one or more impurities and a waste stream enriched in the one or more impurities.

Aspect 63: A process according to Aspect 62, wherein the pure hydrogen liquid stream is purified by reboiling against at least a portion of the ultra-pure hydrogen stream.

Aspect 64: A process according to Aspect 62 or Aspect 63, wherein the pure hydrogen liquid stream is purified by reboiling against at least a portion of the partially condensed pure hydrogen stream.

Aspect 65: A process according to any of Aspects 62 to 64, wherein the pure hydrogen liquid stream is purified by passing the pure hydrogen liquid through a liquid phase adsorber to produce the ultra-pure hydrogen stream and a loaded liquid-phase adsorber; and passing a liquid-phase adsorber regeneration gas through the loaded liquid-phase adsorber to regenerate the loaded liquid-phase adsorber and produce a spent liquid-phase adsorber regeneration gas enriched in the one or more impurities.

BRIEF DESCRIPTION OF THE DRAWINGS

The present disclosure is hereinafter described in conjunction with the appended figures wherein like numerals denote like elements.

DETAILED DESCRIPTION

Figure 1:
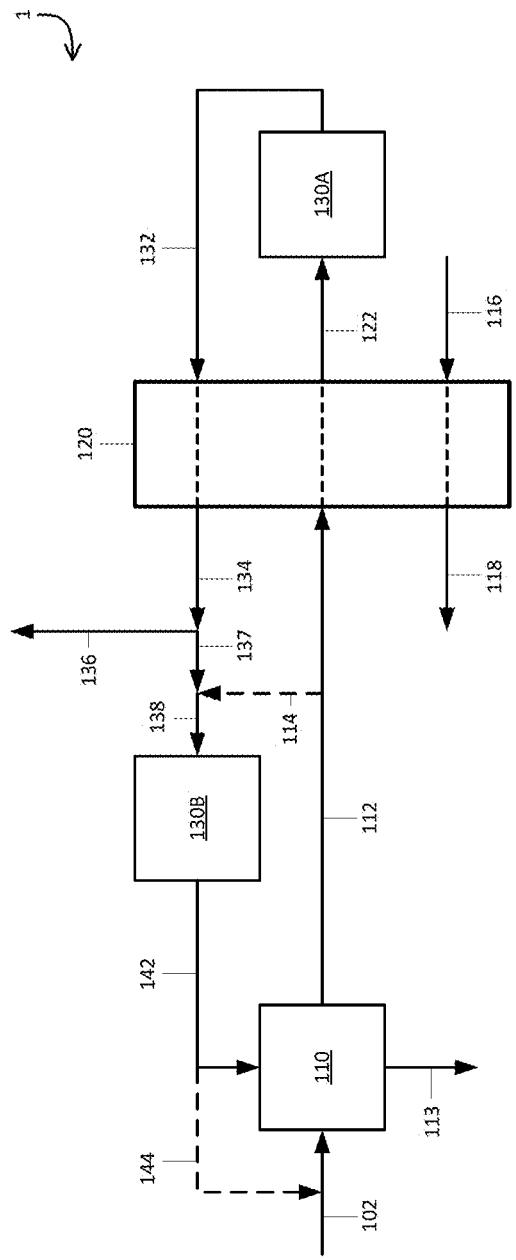
FIG. 1 is a diagram depicting an embodiment of a hydrogen purification process comprising a CTSA process.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The articles "a" or "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The phrase "at least a portion" means "a portion or all." The "at least a portion of a stream" has the same composition, with the same concentration of each of the species, as the stream from which it is derived.

The term "and/or" placed between a first entity and a second entity includes any of the meanings of (1) only the first entity, (2) only the second entity, or (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B but not C, (5) A and C but not B, (6) B and C but not A, and (7) A and B and C.

The adjective "any" means one, some, or all, indiscriminately of quantity.

The terms "depleted" or "lean" mean having a lesser mole percent concentration of the indicated component than the original stream from which it was formed. "Depleted" and "lean" do not mean that the stream is completely lacking the indicated component.

The terms "rich" or "enriched" mean having a greater mole percent concentration of the indicated component than the original stream from which it was formed.

"Downstream" and "upstream" refer to the intended flow direction of the process fluid transferred. If the intended flow direction of the process fluid is from the first device to the second device, the second device is downstream of the first device. In case of a recycle stream, downstream and upstream refer to the first pass of the process fluid.

The term "indirect heat exchange" refers to the process of transferring sensible heat and/or latent heat between two or more fluids without the fluids in question coming into physical contact with one another. The heat may be transferred through the wall of a heat exchanger or with the use of an intermediate heat transfer fluid. The term "hot stream" refers to any stream that exits the heat exchanger at a lower temperature than it entered. Conversely, a "cold stream" is one that exits the heat exchanger at a higher temperature than it entered.

FIG. 1 shows an embodiment of a process 1 for the purification of a hydrogen feed stream 112 which comprises one or more impurities selected from the group consisting of nitrogen, argon, methane, carbon monoxide, carbon dioxide, and water. The hydrogen feed stream 112 may be produced by a upgrading a crude hydrogen stream 102 in hydrogen enrichment system 110, also producing a tail gas stream 113 enriched in the one or more impurities. The crude hydrogen stream may be supplied by any suitable hydrogen production process such as a steam methane reformer (SMR) or partial oxidation reactor (PDX). The hydrogen enrichment system 110 may be any suitable separation process such as a pressure swing adsorption (PSA) system.

The hydrogen feed stream 112 is cooled in heat exchanger 120 to between 50 and 80 K to produce cooled hydrogen stream 122. Refrigeration duty may be provided by an external refrigeration source 116, selected according to the temperature specification of cooled hydrogen stream 122. For example, an 80K outlet temperature may be achieved using liquid nitrogen as the external refrigeration source 116, whereas a 50K outlet temperature may be achieved using liquid hydrogen as the external refrigeration source 116.

The cooled hydrogen stream is passed through an online adsorber 130A that removes one or more impurities from the cooled hydrogen stream allowing pure hydrogen stream 132 to exit. The online adsorber 130A may utilize one or more high surface area adsorbents, including but not limited to zeolites, metal-organic frameworks (MOF), alumina, silica gel, silicalites, activated carbon, Engelhard titanosilicate (ETS), and metal oxides. The concentration of impurities in the pure hydrogen stream 132 may be below 100 ppb or below 1 ppb. The pure hydrogen stream 132 is then warmed in the heat exchanger 120 against the hydrogen feed stream 112 to produce warmed pure hydrogen stream 134. At least a portion of warmed pure hydrogen stream 134 may be divided to form a pure hydrogen product stream 136.

The online adsorber 130A over time will become loaded with impurities to the point that the efficiency of impurity removal falls and the pure hydrogen stream 132 is outside of specifications. At this point the online adsorber 130A may be switched to regeneration mode as loaded adsorber 130B. In regeneration mode a regeneration gas stream 138 is passed through the loaded adsorber 130B to remove the one or more impurities from the loaded adsorbent. The regeneration gas stream 138 may be formed by at least a portion of the warmed pure hydrogen stream 134 which may be divided to form a pure hydrogen fraction 137, and/or at least a portion of the hydrogen feed stream 112 which may be divided to form a hydrogen feed fraction 114. The regeneration gas stream 138 leaves the loaded adsorber 130B as a spent regeneration gas stream 142 enriched in the one or more impurities. Despite this enrichment in impurities relative to the regeneration gas stream 138, the spent regeneration gas stream 142 has a higher concentration of hydrogen than the crude hydrogen stream 102. Once the loading of the one or more impurities on the loaded adsorber 130B is reduced to the point that it can once again be used to purify the cooled hydrogen stream 122, it may be switched to the online position 130A.

The spent regeneration gas stream 142 may then be recycled to the hydrogen enrichment system 110. The hydrogen enrichment system may be a PSA in which a plurality of adsorbent beds go through a cycle of steps including adsorption (where the hydrogen-enriched hydrogen feed stream 112 is withdrawn), depressurization (where some gas is used to repressurize other beds and some is sent to tail gas stream 113), purge (where an essentially pure hydrogen gas stream is introduced to remove one or more of the impurities), and repressurization (where gas from depressurization steps or the hydrogen feed stream 112 is used to increase the pressure of the bed to the feed pressure). In the case where the hydrogen enrichment system is a PSA with a counter-current purge step, at least a portion of the spent regeneration gas stream 142 may be used as part or all of the purge gas. At least a portion of the spent regeneration gas stream 142 may be divided to form second spent regeneration gas fraction 144 which is combined with the crude hydrogen stream 102.

In some embodiments of the present invention the hydrogen enrichment system 110 may comprise an electrochemical separator, or ECS. ECS is well described in Abens (U.S. Pat. No. 4,620,914), in which hydrogen is purified by applying a voltage across two electrodes separated by an electrolyte suitable for the transport of hydrogen ions. The ECS functions similarly to a fuel cell operated in reverse to drive the migration of hydrogen from the crude hydrogen stream 102 to the hydrogen feed stream 112. The hydrogen-depleted crude hydrogen stream 102 leaves the ECS as tail gas stream 113. Because most ECS systems are poisoned by CO, crude hydrogen with CO such as from SMR requires pretreatment to remove CO to levels tolerated by the electrodes and/or electrolyte. ECS is particularly advantageous for crude hydrogen without CO, such as from recycle applications or the electrolysis of water.

Figure 2:
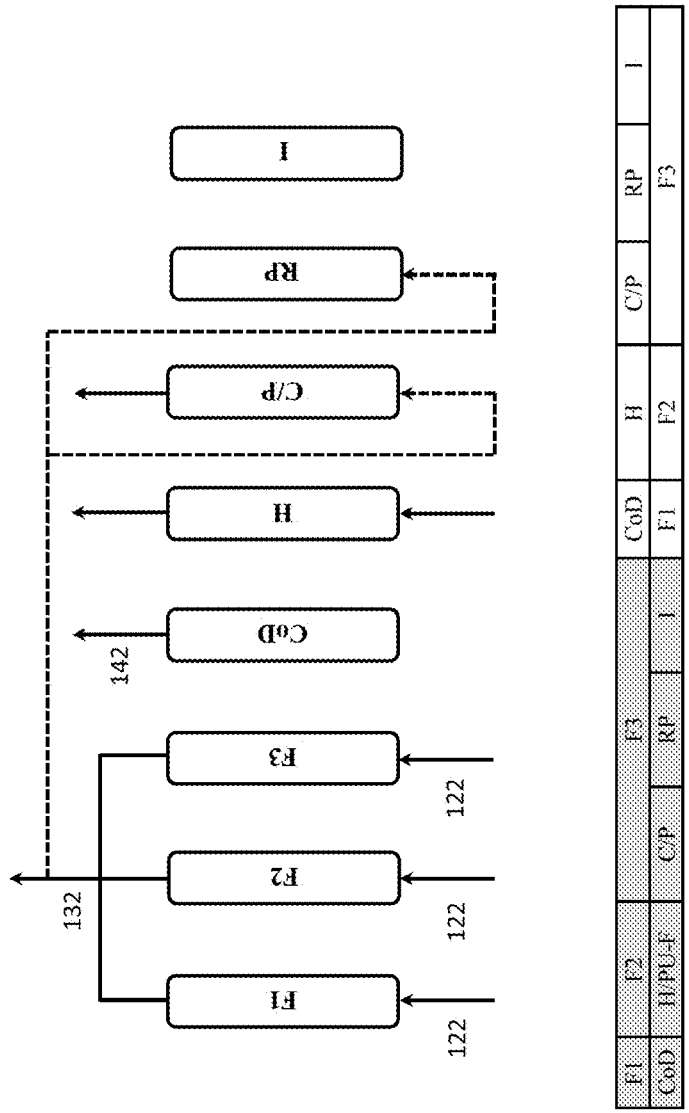
FIG. 2 is a diagram depicting the cycle for a CSTA process.

The cycle used for the CTSA is shown in greater detail in FIG. 2, a time series of the steps a single bed experiences over the course of a single cycle. One or more CTSA beds may be in the feed step simultaneously. In the example shown in FIG. 2, the CTSA process uses 2 beds, where the first bed undergoes each step of the CTSA cycle in sequence and the second bed also undergoes each step of the CTSA cycle in the same sequence order, however the timing of the two beds are arranged such that the start and finish of the two beds are staggered. The cycle schedule is also shown in tabular format in FIG. 2. In the schedule, each row of the grid represents all the different cycle steps a given bed undergoes over the entire cycle, whereas a column of the grid represents which cycle step is being run by which bed at a particular unit time step. The total cycle time is the sum of all the individual unit time steps of a particular row. The cycle comprises a feed step (divided into steps F1, F2, and F3 to show how the feed step matches with the other steps), a co-current blowdown step (CoD), a heating step (H), a cooling with product step (C/P), a repressurization step (RP) and an idle step (I). Once an adsorption bed has been pressurized to the highest-pressure level of the cycle with pure hydrogen stream 132 and the temperature of interest in the bed is constant (typically within 2 to 5 degrees C. of design), the cooled hydrogen stream is introduced to the inlet end of bed and the un-adsorbed pure hydrogen stream comprising hydrogen is discharged from the outlet end of bed. The feed step is continued until the mass transfer zone (MTZ) of preferentially adsorbed component reaches the exit end of the bed without substantially breaking through it. At the termination of the feed step, the bed is de-pressurized co-currently to the feed step to or near ambient pressure level. Upon termination of the de-pressurization step, the bed is heated with hydrogen feed gas 112. The heat-up step is conducted co-currently to the feed step and is continued until the temperature at the exit end of bed is the same as the hot gas temperature. During the heat-up step, the effluent comprising the one or more impurities is withdrawn. Following the heat-up step, the bed is cooled down and re-pressurized to the feed pressure level for initiation and repetition of the cycle. Note that the regeneration steps (such as de-pressurization, heat-up, cooldown and re-pressurization) can also be conducted counter-currently (oppositive direction of feed step). This will ensure that the product end of the bed is completely free of the one or more impurities.

The temperature chosen for the regeneration steps presents an engineering tradeoff. Higher temperatures improve the efficiency of regeneration in terms of time and/or regeneration gas flow rate required, but also require greater heating and cooling duties and more time during the heat-up step and cooldown step. Baldus regenerated the CTSA at a temperature below 220 K and Wei et al. at a temperature below around 233 K. However, the present inventors have found an unexpected benefit to regeneration at ambient temperature which provides an optimum heat-up/cool down time while eliminating all the loaded impurities from the bed with reduced amount of regeneration gas.

Figure 3:
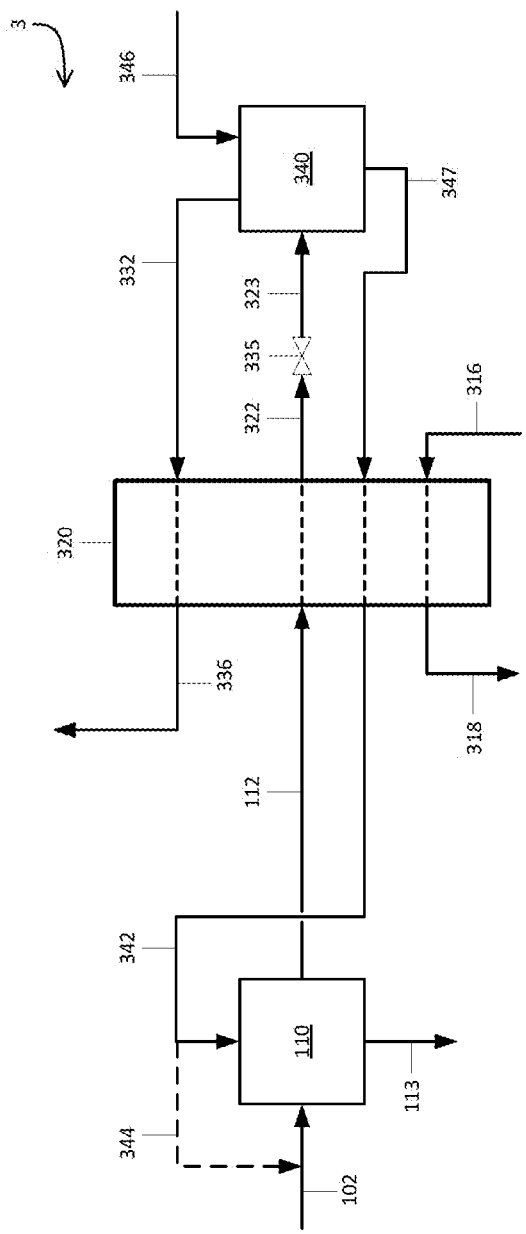
FIG. 3 is a diagram depicting an embodiment of a hydrogen purification process comprising a CWC process.

FIG. 3 shows an embodiment of a process 3 for the purification of the hydrogen feed stream 112 which as seen in FIG. 1 may be produced by a upgrading a crude hydrogen stream 102 in hydrogen enrichment system 110.

The hydrogen feed stream 112 is cooled in heat exchanger 320 to between 20 and 35 K, or between 25 and 34K, or around 30 K to produce cooled hydrogen stream 322. The temperature is selected such that the hydrogen feed stream will be above, but close to, the dew point at that given pressure. Refrigeration duty may be provided by an external refrigeration source 316, for example, liquid nitrogen and/or liquid hydrogen. The cooled hydrogen stream 322 may be cooled further by reducing the pressure to form a second cooled hydrogen stream 323. The pressure reduction may be effected by a valve 335 or any other pressure reduction device such as an expander.

The second cooled hydrogen stream 323 is then fed to a cryogenic wash column 340 where it is contacted with a liquid hydrogen wash stream 346. The cryogenic wash column 340 may comprise trays and/or packing to increase the efficiency of mass transfer between the second cooled hydrogen stream 323 and the liquid hydrogen wash stream 346. A pure hydrogen stream 332 exits the top of the cryogenic wash column 340. The concentration of impurities in the pure hydrogen stream 332 may be below 100 ppb or below 1 ppb. The pure hydrogen stream 332 is then warmed in the heat exchanger 320 against the hydrogen feed stream 112 to produce pure hydrogen product stream 336. Using the pure hydrogen product as a refrigerant contrasts with a typical hydrogen liquefier in which a hydrogen recycle stream provides refrigeration before being recycled to the liquefier feed. A liquid hydrogen effluent stream 347 enriched in the one or more impurities exits the bottom of the cryogenic wash column 340. The liquid hydrogen effluent stream 347 is then warmed in the heat exchanger 320 against the hydrogen feed stream 112 to produce an effluent stream 342.

The effluent stream 342 may then be recycled to the hydrogen enrichment system 110. In the case where the hydrogen enrichment system is a PSA with a counter-current purge step in which a purge gas is introduced to remove one or more of the impurities from the plurality of adsorbent beds, at least a portion of the effluent stream 342 may be used as part or all of the purge gas. At least a portion of the effluent stream 342 may be divided to form a second effluent fraction 344 which is combined with the crude hydrogen stream 102.

The optional pressure reduction in the second cooled hydrogen stream 323 represents an engineering tradeoff that reduces the demand for liquid hydrogen 346 in exchange for an increase in compression power demand.

Figure 4:
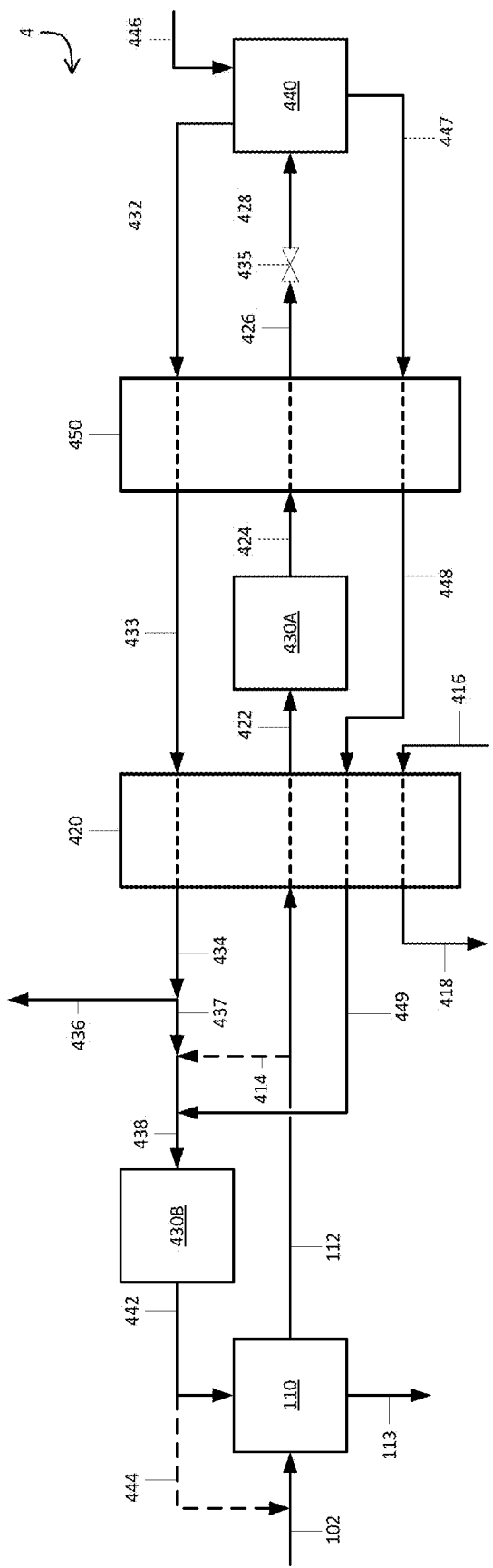
FIG. 4 is a diagram depicting an embodiment of a hydrogen purification process comprising a CTSA process followed by a CWC process.

The CTSA and CWC processes may be combined as shown in FIG. 4, which illustrates process 4 for the purification of the hydrogen feed stream 112 which as in FIG. 1 may be produced by a upgrading a crude hydrogen stream 102 in hydrogen enrichment system 110.

The hydrogen feed stream 112 is cooled in first heat exchanger 420 to between 50 and 80 K to produce cooled hydrogen stream 422. Refrigeration duty may be provided by an external refrigeration source 416, selected according to the temperature specification of cooled hydrogen stream 422, for example, liquid nitrogen and/or liquid hydrogen.

The cooled hydrogen stream passes through an online adsorber 430A that removes one or more impurities from the cooled hydrogen stream allowing pure hydrogen stream 424 to exit. The concentration of impurities in the pure hydrogen stream 424 is lower than in the hydrogen feed stream 112, but still above the desired specifications for the one or more impurities. The pure hydrogen stream 424 is then cooled in a second heat exchanger 450 to produce cooled pure hydrogen stream 426. The cooled pure hydrogen stream 426 may be cooled further by reducing the pressure to form a second cooled pure hydrogen stream 428. The pressure reduction may be effected by a valve 435 or any other pressure reduction device such as an expander.

The second cooled pure hydrogen stream 428 is then fed to a cryogenic wash column 440 where it is contacted with a liquid hydrogen wash stream 446. The cryogenic wash column 440 may comprise trays and/or packing to increase the efficiency of mass transfer between the second cooled pure hydrogen stream 428 and the liquid hydrogen wash stream 446. An ultra-pure hydrogen stream 432 exits the top of the cryogenic wash column 440. The concentration of impurities in the ultra-pure hydrogen stream 432 may be below 100 ppb or below 1 ppb. The ultra-pure hydrogen stream 432 is then warmed in the second heat exchanger 450 against the pure hydrogen stream 424 to produce a first warmed ultra-pure hydrogen stream 433. A liquid hydrogen effluent stream 447 enriched in the one or more impurities exits the bottom of the cryogenic wash column 440. The liquid hydrogen effluent stream 447 is then warmed in the second heat exchanger 450 against the pure hydrogen stream 424 to produce a warmed effluent stream 448.

One advantage the cryogenic wash column 440 has over adsorption is deeper removal of weakly-adsorbing species such as argon and oxygen. This allows balancing the duty for removing argon and oxygen between the cryogenic wash column 440 and the online adsorber 430A. For example, the online adsorber 430A could be operated at 80 K while the cryogenic wash column 440 removes any argon and oxygen that slips through the online adsorber 430A.

The first warmed ultra-pure hydrogen stream 433 is warmed in the first heat exchanger 420 against the hydrogen feed stream 112 to produce a second warmed ultra-pure hydrogen stream 434. At least a portion of the second warmed ultra-pure hydrogen stream 434 may be divided to form an ultra-pure hydrogen product stream 436. The warmed effluent stream 448 is also warmed in the first heat exchanger 420 against the hydrogen feed stream 112 to produce an effluent stream 449.

First heat exchanger 420 and second heat exchanger 450 represent a heat exchanger system that can be a single heat exchanger or be split into two or more heat exchangers in series or parallel. In general, the more integrated the heat exchanger system is, the more efficient the heat exchange is between all of the desired streams. However, the heat exchanger is often divided, which sacrifices efficiency, because the resulting small increase in overall power allows an advantage such as simplified operation, a smaller heat exchanger system, a simpler design of the heat exchanger system, or the reduction of risk to the process.

The online adsorber 430A over time will become loaded with impurities to the point that the efficiency of impurity removal falls and the pure hydrogen stream 432 is outside of specifications. In practice the composition of the ultra-pure hydrogen stream 424 may be monitored instead of pure hydrogen stream 432. At this point the loaded adsorber 430B may be switched to regeneration mode. In regeneration mode a regeneration gas stream 438 is passed through the loaded adsorber 430B to remove the one or more impurities from the loaded adsorbent. The regeneration gas stream 438 may be formed by at least a portion of the second warmed ultra-pure hydrogen stream 434 which may be divided to form an ultra-pure hydrogen fraction 437, at least a portion of the hydrogen feed stream 112 which may be divided to form a hydrogen feed fraction 414, and/or at least a portion of the effluent stream 449. The regeneration gas stream 438 leaves the loaded adsorber 430B as spent regeneration gas stream 442 comprising the one or more impurities. Once the loading of the one or more impurities on the loaded adsorber 430B is reduced to the point that it can once again be used to purify the cooled hydrogen stream 422, it may be switched to the online position 430A.

The spent regeneration gas stream 442 may then be recycled to the hydrogen enrichment system 110. In the case where the hydrogen enrichment system is a PSA with a counter-current purge step in which a purge gas is introduced to remove one or more of the impurities from the plurality of adsorbent beds, at least a portion of the spent regeneration gas stream 442 may be used as part or all of the purge gas. At least a portion of the spent regeneration gas stream 442 may be divided to form second spent regeneration gas fraction 444 which is combined with the crude hydrogen stream 102.

The second heat exchanger 450 may be operated at a low enough temperature to freeze out impurities from the pure hydrogen stream 424. In this case the second heat exchanger 450 acts as a reversing heat exchanger, switching from an onstream mode in which the pure hydrogen stream 424 is cooled and impurities are frozen onto the walls and a regeneration mode in which a warm regeneration gas flows through the passages and removes the impurities. However, due to the low initial concentration of impurities in the pure hydrogen stream 424, the impurities accumulate on the walls of the second heat exchanger 450 so slowly that the onstream time before clogging or high pressure drop is observed is on the order of several years. In contrast to most uses of reversing heat exchangers, for example air separation and hydrogen liquefiers where the onstream time is on the order of minutes or hours, the second heat exchanger 450 would only have to be regenerated at regularly scheduled plant outages every 1 to 5 years.

Figure 5:
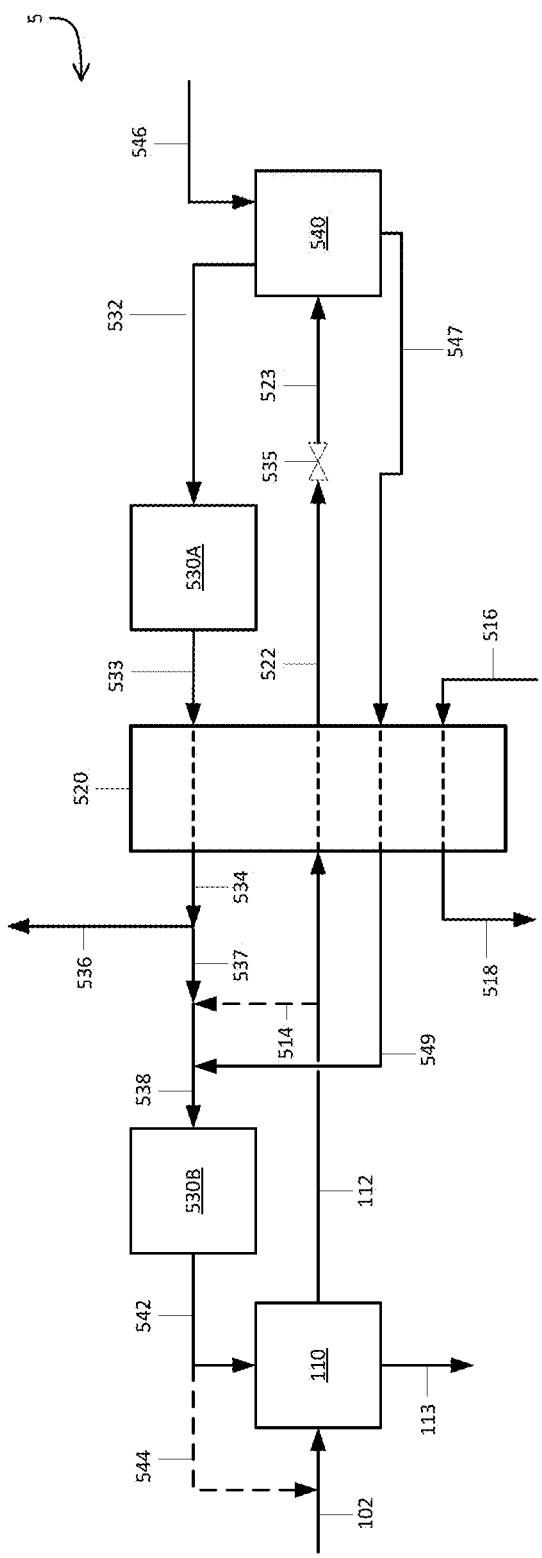
FIG. 5 is a diagram depicting an embodiment of a hydrogen purification process comprising a CWC process followed by a CTSA process.

FIG. 5 shows an embodiment of the present invention in which a CWC is followed by a CTSA. Process 5 illustrates the purification of the hydrogen feed stream 112 which, as in FIG. 1, may be produced by upgrading a crude hydrogen stream 102 in hydrogen enrichment system 110.

The hydrogen feed stream 112 is cooled in heat exchanger 520 to between 20 and 35 K, or between 25 and 34K, or around 30 K to produce cooled hydrogen stream 522. The temperature is selected such that the hydrogen feed stream will be close to the dew point for pure hydrogen at that given pressure. Refrigeration duty may be provided by an external refrigeration source 516, for example, liquid nitrogen and/or liquid hydrogen. The cooled hydrogen stream 522 may be cooled further by reducing the pressure to form a second cooled hydrogen stream 523. The pressure reduction may be effected by a valve 535 or any other pressure reduction device such as an expander.

The second cooled hydrogen stream 523 is then fed to a cryogenic wash column 540 where it is contacted with a liquid hydrogen wash stream 546. Because the temperature of the hydrogen feed stream 112 is near the dew point for pure hydrogen at the column pressure, the vaporization of the liquid hydrogen wash stream 546 is minimized. The cryogenic wash column 540 may comprise trays and/or packing to increase the efficiency of mass transfer between the second cooled hydrogen stream 523 and the liquid hydrogen wash stream 546. A pure hydrogen stream 532 exits the top of the cryogenic wash column 540. The concentration of impurities in the pure hydrogen stream 532 may be below 100 ppb or below 1 ppb. A liquid hydrogen effluent stream 547 enriched in the one or more impurities exits the bottom of the cryogenic wash column 540. The liquid hydrogen effluent stream 547 is then warmed in the heat exchanger 520 against the hydrogen feed stream 112 to produce an effluent stream 549.

The optional pressure reduction in the second cooled hydrogen stream 523 represents an engineering tradeoff that reduces the demand for liquid hydrogen 546 in exchange for an increase in compression power demand.

The pure hydrogen stream 532 is then passed through an online adsorber 530A that removes one or more impurities from the cooled hydrogen stream allowing ultra-pure hydrogen stream 533 to exit. The online adsorber 530A may utilize one or more high surface area adsorbents, including but not limited to zeolites, metal-organic frameworks (MOF), alumina, silica gel, silicalites, activated carbon, Engelhard titanosilicate (ETS), and metal oxides. The concentration of impurities in the ultra-pure hydrogen stream 532 may be below 100 ppb or below 1 ppb. The ultra-pure hydrogen stream 533 is then warmed in the heat exchanger 520 against the hydrogen feed stream 112 to produce warmed ultra-pure hydrogen stream 534. At least a portion of warmed ultra-pure hydrogen stream 534 may be divided to form an ultra-pure hydrogen product stream 536.

The online adsorber 530A over time will become loaded with impurities to the point that the efficiency of impurity removal falls and the ultra-pure hydrogen stream 533 is outside of specifications. At this point the online adsorber 530A may be switched to regeneration mode as loaded adsorber 530B. In regeneration mode a regeneration gas stream 538 is passed through the loaded adsorber 530B to remove the one or more impurities from the loaded adsorbent. The regeneration gas stream 538 may be formed by at least a portion of the warmed ultra-pure hydrogen stream 534 which may be divided to form an ultra-pure hydrogen fraction 537, at least a portion of the hydrogen feed stream 112 which may be divided to form a hydrogen feed fraction 514, and/or at least a portion of the effluent stream 549. The regeneration gas stream 538 leaves the loaded adsorber 530B as a spent regeneration gas stream 542 enriched in the one or more impurities. Despite this enrichment in impurities relative to the regeneration gas stream 538, the spent regeneration gas stream 542 has a higher concentration of hydrogen than the crude hydrogen stream 102. Once the loading of the one or more impurities on the loaded adsorbent 530B is reduced to the point that it can once again be used to purify the pure hydrogen stream 532, it may be switched to the online position 530A.

The spent regeneration gas stream 542 may then be recycled to the hydrogen enrichment system 110. The hydrogen enrichment system may be a PSA in which a plurality of adsorbent beds go through a cycle of steps including adsorption (where the hydrogen-enriched hydrogen feed stream 112 is withdrawn), depressurization (where some gas is used to repressurize other beds and some is sent to tail gas stream 113), purge (where an essentially pure hydrogen gas stream is introduced to remove one or more of the impurities), and repressurization (where gas from depressurization steps or the hydrogen feed stream 112 is used to increase the pressure of the bed to the feed pressure). In the case where the hydrogen enrichment system is a PSA with a counter-current purge step, at least a portion of the spent regeneration gas stream 542 may be used as part or all of the purge gas. At least a portion of the spent regeneration gas stream 542 may be divided to form second spent regeneration gas fraction 544 which is combined with the crude hydrogen stream 102.

Figure 6:
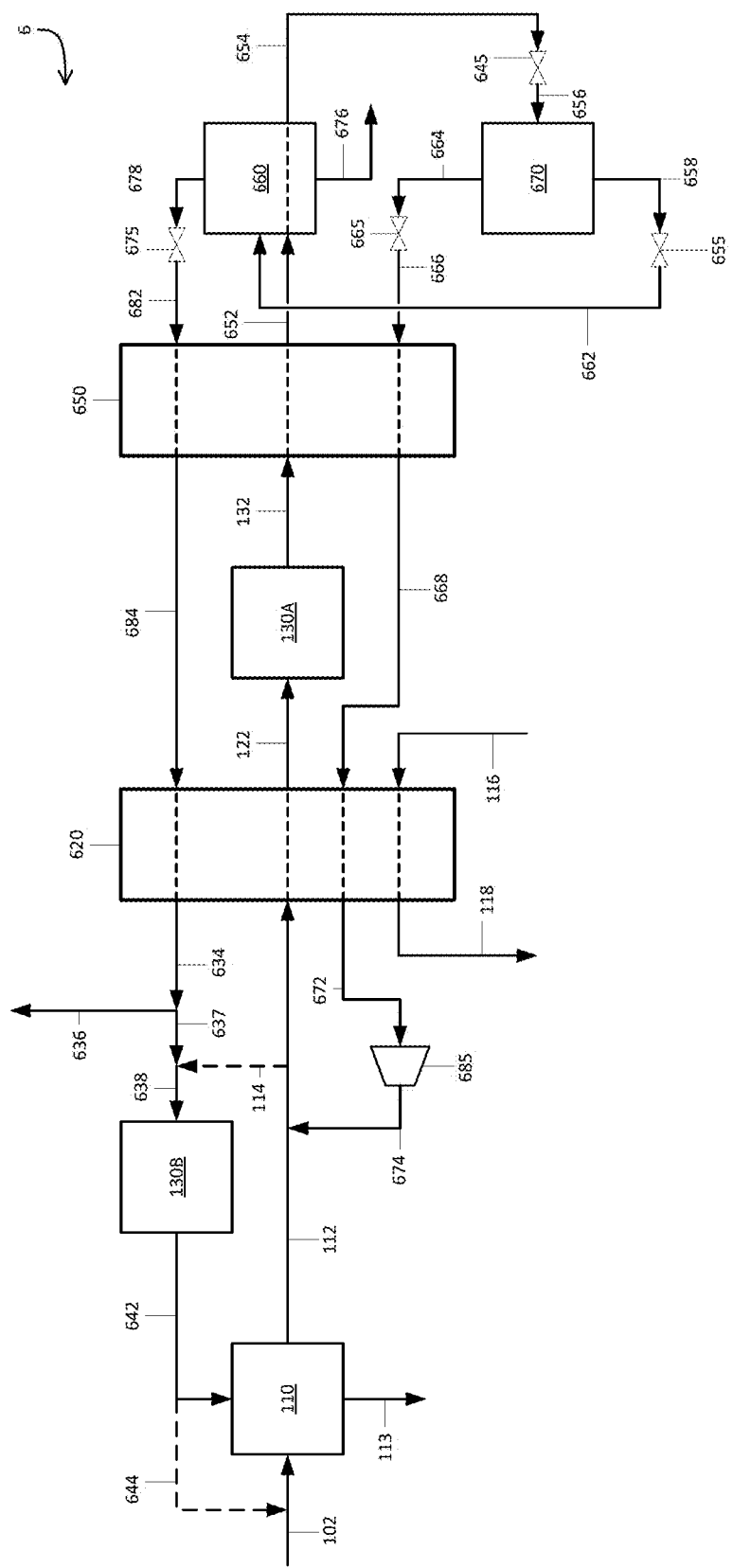
FIG. 6 is a diagram depicting an embodiment of a hydrogen purification process comprising a CTSA process followed by a hydrogen liquefier.

The present invention can also be integrated with a hydrogen liquefier as shown in FIG. 6, in which process 6 allows for the purification of the hydrogen feed stream 112 which as in FIG. 1 may be produced by a upgrading a crude hydrogen stream 102 in hydrogen enrichment system 110, also producing a tail gas stream 113 enriched in the one or more impurities.

The hydrogen feed stream 112 is cooled in a first heat exchanger 620 that operates in a similar fashion to heat exchanger 110 in FIG. 1 to produce a cooled hydrogen stream 122 that is purified in online adsorber 130A to produce pure hydrogen stream 132.

The pure hydrogen stream 132 is cooled by indirect heat exchange in two stages, second heat exchanger 650 and a heat exchanger integrated into a liquid hydrogen tank 660, producing a partially condensed pure hydrogen stream 654 which may be reduced in pressure across valve 645 before being separated in separator 670 into hydrogen liquid stream 658 and hydrogen vapor stream 664. The hydrogen liquid stream may be let down in pressure across valve 655 and fed to the liquid hydrogen tank 660. The hydrogen vapor stream 664 may be let down in pressure across valve 665 to form hydrogen recycle stream 666. The hydrogen recycle stream 666 may then provide refrigeration to second heat exchanger 650 and first heat exchanger 620 before being compressed in compressor 685 and combined with the hydrogen feed stream 112 as compressed hydrogen recycle stream 674.

An ultra-pure hydrogen vapor 678 exits the liquid hydrogen tank 660 and may be reduced in pressure across valve 675 if extra refrigeration duty is required before being warmed in second heat exchanger 650 and first heat exchanger 620 to form warmed ultra-pure hydrogen stream 634. At least a portion of the warmed ultra-pure hydrogen stream 634 is divided to form ultra-pure hydrogen product 636. An impurities-enriched hydrogen liquid 676 may be warmed and recycled to the crude hydrogen stream 102 (not shown).

As in FIG. 1, the loaded adsorber 130B may be regenerated using a regeneration gas 638 to remove the one or more impurities from the loaded adsorbent. The regeneration gas stream 638 may be formed by at least a portion of the warmed pure hydrogen stream 634 which may be divided to form a pure hydrogen fraction 637, and/or at least a portion of the hydrogen feed stream 112 which may be divided to form a hydrogen feed fraction 114. The regeneration gas stream 638 leaves the loaded adsorber 130B as a spent regeneration gas stream 642 enriched in the one or more impurities. Despite this enrichment in impurities relative to the regeneration gas stream 638, the spent regeneration gas stream 642 has a higher concentration of hydrogen than the crude hydrogen stream 602. Once the loading of the one or more impurities on the loaded adsorber 130B is reduced to the point that it can once again be used to purify the cooled hydrogen stream 122, it may be switched to the online position 130A.

The spent regeneration gas stream 642 may then be recycled to the hydrogen enrichment system 110. The hydrogen enrichment system may be a PSA in which a plurality of adsorbent beds go through a cycle of steps including adsorption (where the hydrogen-enriched hydrogen feed stream 112 is withdrawn), depressurization (where some gas is used to repressurize other beds and some is sent to tail gas stream 113), purge (where an essentially pure hydrogen gas stream is introduced to remove one or more of the impurities), and repressurization (where gas from depressurization steps or the hydrogen feed stream 112 is used to increase the pressure of the bed to the feed pressure). In the case where the hydrogen enrichment system is a PSA with a counter-current purge step, at least a portion of the spent regeneration gas stream 642 may be used as part or all of the purge gas. At least a portion of the spent regeneration gas stream 642 may be divided to form second spent regeneration gas fraction 644 which is combined with the crude hydrogen stream 102.

Figure 7:
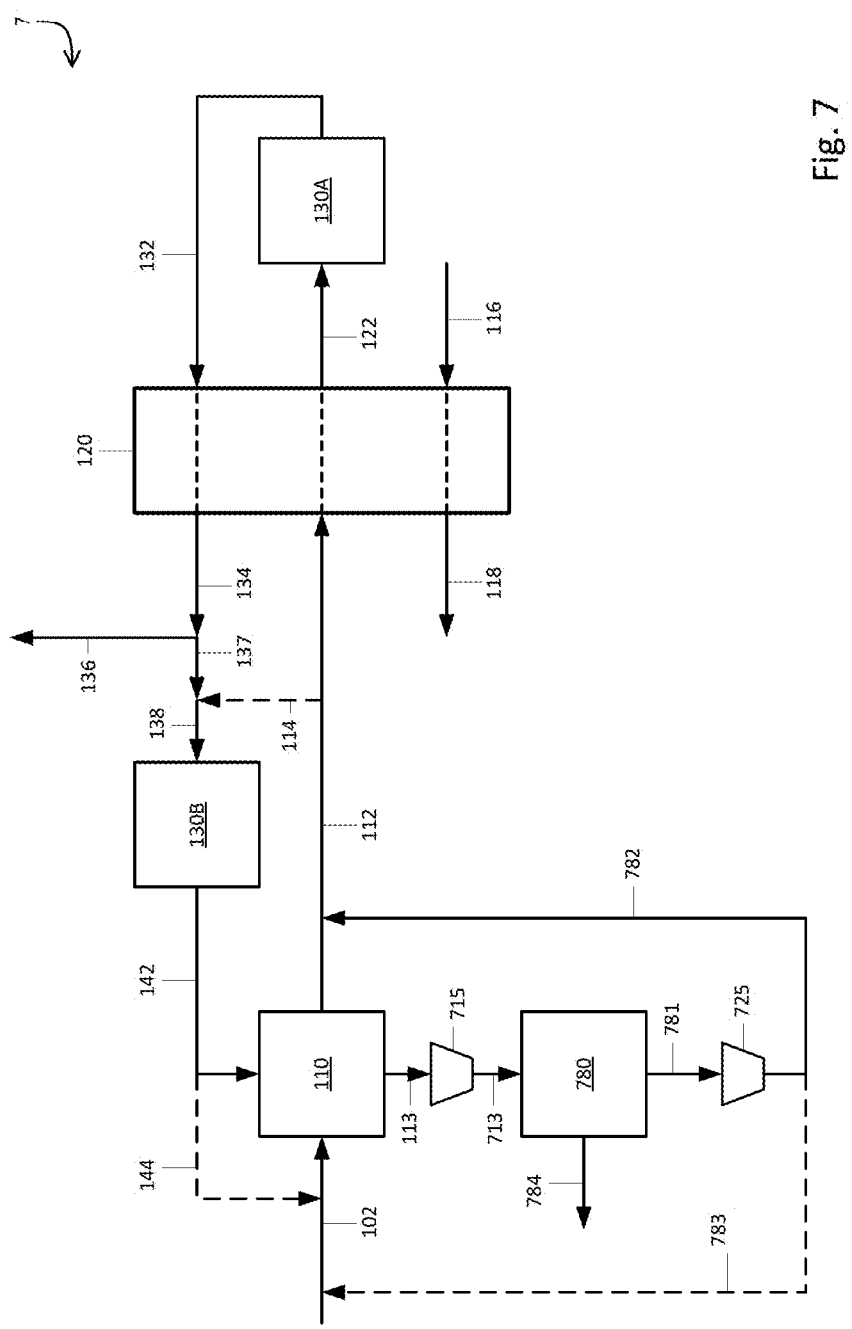
FIG. 7 is a diagram depicting a modification of FIG. 1 in which hydrogen is recycled from the tail gas.

The tail gas leaving the hydrogen enrichment system may be further processed to improve overall hydrogen recovery. This is illustrated in FIG. 7 where process 7 represents an embodiment of process 1 with a tail gas separator 780 configured to separate hydrogen from the tail gas stream 113 leaving the hydrogen enrichment system 110, producing a hydrogen-enriched tail gas fraction 781 and a hydrogen-depleted tail gas fraction 784. The hydrogen-enriched tail gas fraction 781 may be recycled downstream or upstream of the hydrogen enrichment system 110. Depending on the process requirements of the tail gas separator 780, the tail gas stream 113 may be compressed in compressor 715 to produce compressed tail gas stream 713. The hydrogen-enriched tail gas fraction 781 may be compressed if needed in compressor 725 to combine with either the hydrogen feed stream 112 via line 782 or the crude hydrogen stream 102 via line 783. The hydrogen-depleted tail gas fraction 784 may be vented or sent to further processing if required for emissions standards.

The tail gas separator 780 may comprise one or more membrane stages in series or parallel. Hydrogen preferentially permeates the membrane over slower species such as nitrogen. Owing to the small size of the hydrogen molecule, it has a high diffusivity and therefore is expected to permeate faster than nitrogen for the vast majority of membrane materials. The permeate pressure may range from 1 to 50 psig, or from 1 to 20 psig, or from 1 to 3 psig.

Sanders et al (Polymer; vol 54; pp 4729-4761; 2013) provide a convenient summary of current membrane technology. They describe the physical parameters and performance characteristics of polymeric membranes including polysulfones, cellulose acetate, aramids, polyimides, and polycarbonates. Essentially all current industrially useful gas separations are performed with polymers such as those listed above or rubbery materials such as silicone. Other membrane materials such as mixed-matrix membranes, perfluoropolymers, thermally rearranged polymers, facilitated transport membranes, metal-organic frameworks, zeolitic-imidazolate frameworks, and carbon molecular sieves, are in varying stages of development. The membrane material in the present invention tail gas separator 780 can be any of those listed above, or any other material that has a faster permeation rate for some compounds such as helium and a slower permeation rate for some compounds such as methane.

The membrane is typically formed into either hollow fibers or spiral-wound flat sheets, both of which serve to provide large surface area for a relatively small volume, and housed in a module. Gas entering the module contacts the membrane, and a fraction of the gas permeates through the membrane and leaves the module in the lower-pressure permeate stream. The faster gases will be enriched in the permeate relative to the slower gases. The fraction of the gas that does not permeate through the membrane leaves the module in the non-permeate, or retentate, stream which is enriched in the slower gases relative to the faster gases.

The tail gas separator 780 may also comprise an electrochemical separator, or ECS. Voltage is applied to an ECS membrane to drive the migration of hydrogen from a lower concentration in the tail gas stream 113 to a higher concentration in the hydrogen-enriched tail gas stream 781. Because most ECS membranes require water to operate efficiently, the hydrogen-enriched tail gas stream 781 may require dehydration prior to combination with either the crude hydrogen stream 102 or the hydrogen feed stream 112.

Dehydration may be achieved with any suitable technology including TSA driers, membranes, or TEG absorption.

Figure 8:
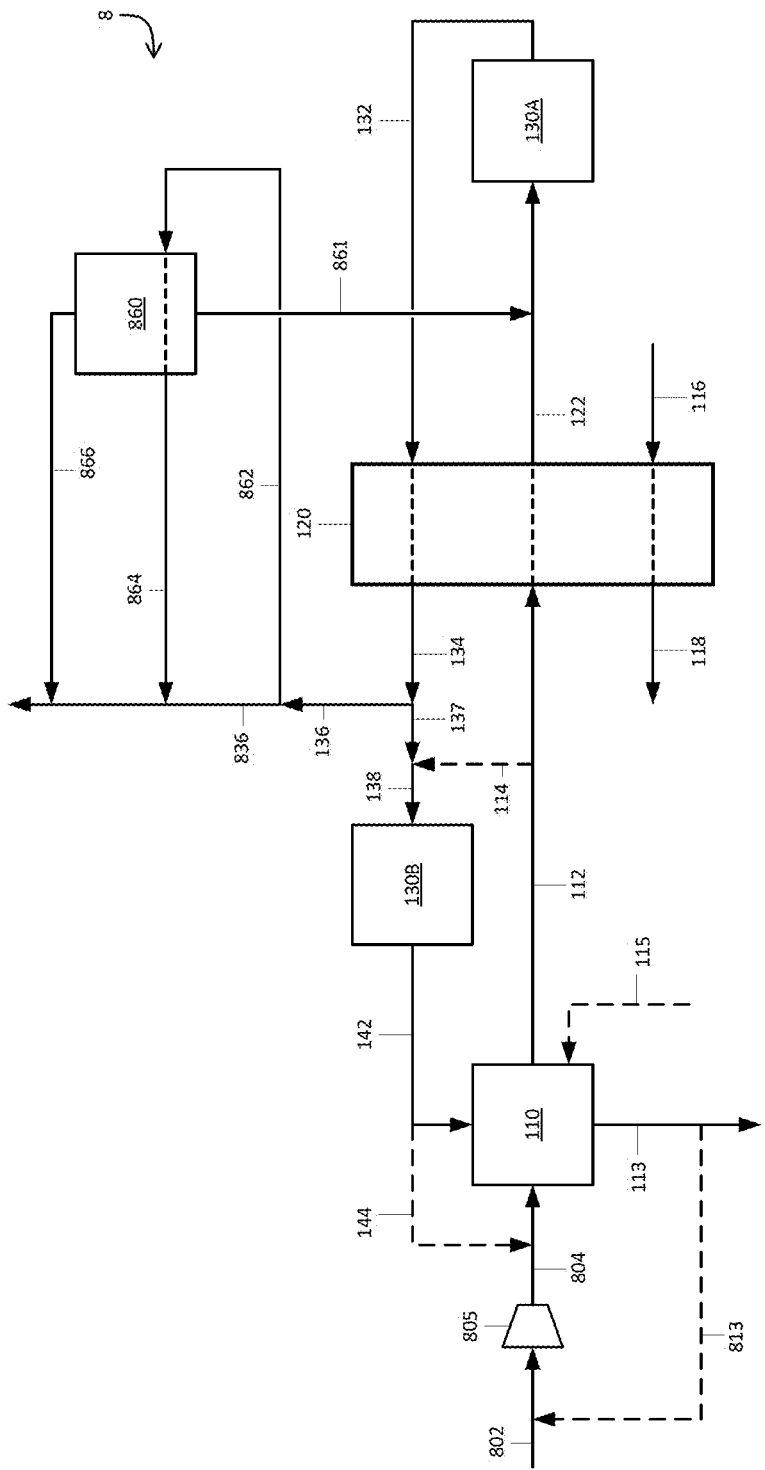
FIG. 8 is a diagram depicting a modification of FIG. 1 in which a liquid hydrogen tank is integrated with the hydrogen purification process.

FIG. 8 shows an embodiment of the CTSA process in FIG. 1 for the purification of a low-pressure crude hydrogen stream 802, for example a recycled hydrogen stream. Process 8 shows the low-pressure crude hydrogen stream 802 compressed in compressor 805 to form crude hydrogen stream 804 which enters the hydrogen enrichment system 110 as in FIG. 1. When the hydrogen enrichment system 110 is a PSA, or more specifically a rapid cycle PSA (RCPSA), the tail gas stream 113 may have a recoverable level of hydrogen with a hydrogen volume fraction greater than 20%, or greater than 25%, or greater than 30%. The tail gas stream 113 may be divided to form a hydrogen-rich tail gas fraction 813 which may be recycled to the low-pressure crude hydrogen stream 802. The hydrogen-rich tail gas fraction 813 would be obtained during the early stage of the depressurization step when most of the void gas comprises the lighter gases such as hydrogen. The hydrogen-rich tail gas fraction 813 would be obtained at a lower pressure than the crude hydrogen stream 804, and so is compressed in compressor 805 along with the low-pressure crude hydrogen stream 802.

Additionally, when the hydrogen enrichment system 110 is a PSA, or more specifically a rapid cycle PSA (RCPSA), a rinse stream 115 may be introduced to the hydrogen enrichment system by adding a rinse step at the end of the feed step and/or pressure equalization steps. During a rinse step, a heavy gas (where heavy gas is defined as any gas more strongly adsorbed than the product component) is passed through the bed in the same direction as the feed flow (co-current) at feed pressure. The rinse step drives out the co-adsorbed and residual less strongly adsorbed species from inter- and intra-particle void spaces of the adsorbent so that the free volume is mostly replaced by the heavy component. This operation helps to sharpen the mass transfer front of the heavy component thereby intensifying the enrichment and recovery of the light component. When the product gas is hydrogen, virtually any gas other than helium is a heavy gas, but more commonly nitrogen is used for rinse stream 115 because of its low cost and ready availability. Other sources for the rinse stream 115 may include methane, carbon dioxide, or natural gas.

The cooled hydrogen feed stream 122 is combined with a liquid hydrogen stream 861 prior to purification in the online adsorber 130A, further cooling the cooled hydrogen feed stream 122 and reducing the cooling duty needed in heat exchanger 120. The liquid hydrogen stream 861 is supplied from a liquid hydrogen tank 860, which is required for make-up hydrogen in the case of a hydrogen recycle application.

A portion of pure hydrogen product stream 136 may be divided to form a first pure hydrogen fraction 836 and a second pure hydrogen fraction 862. The second pure hydrogen fraction 862 may be used to vaporize liquid hydrogen in the liquid hydrogen tank 860 by indirect heat exchange and produce a cooled second pure hydrogen fraction 864 and a vaporized hydrogen stream 866. The vaporized hydrogen stream 866 may be combined with the cooled second pure hydrogen fraction 864 and the first pure hydrogen fraction 836 and exported as a combined pure hydrogen product stream.

Figure 9:
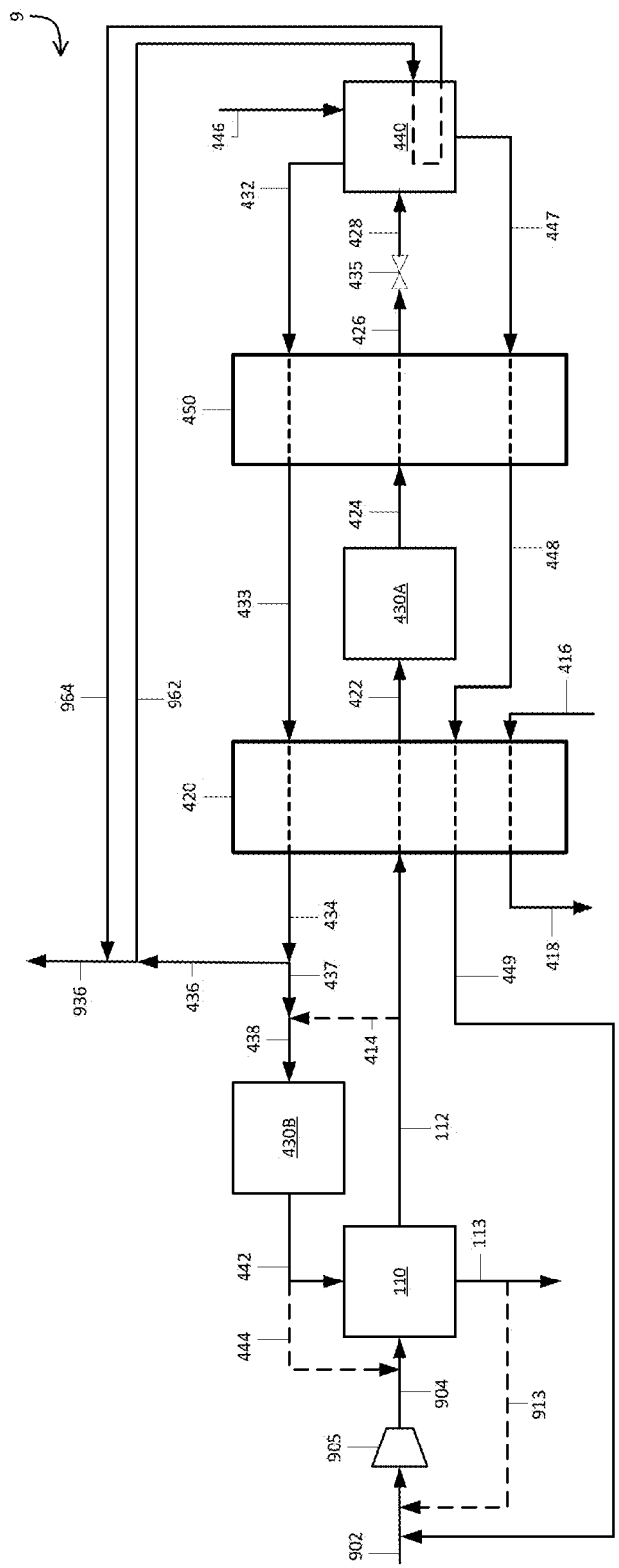
FIG. 9 is a diagram depicting a modification of FIG. 4 in which the CWC comprises a reboiler and the feed is at low pressure.

FIG. 9 shows a modification of the CTSA-CWC process in FIG. 4 for the purification of a low-pressure crude hydrogen stream 902, for example a recycled hydrogen stream. Process 9 shows the low-pressure crude hydrogen stream 902 compressed in compressor 905 to form crude hydrogen stream 904, which enters the hydrogen enrichment system 110 as in FIG. 4. When the hydrogen enrichment system 110 is a PSA, or more specifically a rapid cycle PSA (RCPSA), the tail gas stream 113 may have a recoverable level of hydrogen with a hydrogen volume fraction greater than 20%, or greater than 25%, or greater than 30%. The tail gas stream 113 may be divided to form a hydrogen-rich tail gas fraction 913 which may be recycled to the low-pressure crude hydrogen stream 902. The hydrogen-rich tail gas fraction 913 would be obtained during the early stage of the depressurization step when most of the void gas comprises the lighter gases such as hydrogen. The hydrogen-rich tail gas fraction 913 would be obtained at a lower pressure than the crude hydrogen stream 904, and so is compressed in compressor 905 along with the low-pressure crude hydrogen stream 902.

As in FIG. 8, a portion of pure hydrogen product stream 436 may be divided to form a first pure hydrogen fraction 936 and a second pure hydrogen fraction 962. The second pure hydrogen fraction 962 may be used to provide reboiler duty by indirect heat exchange to the bottom of cryogenic wash column 440. The returning cooled second pure hydrogen fraction 964 is then combined with the first pure hydrogen fraction 936 to form the pure hydrogen product. The effluent stream 449 may be recycled to the low-pressure crude hydrogen stream 902 along with the hydrogen-rich tail gas fraction 913.

The hydrogen enrichment system 110 may be a rapid cycle PSA (RCPSA), which can present advantages in terms of hydrogen recovery, particularly for recycle applications. Any suitable apparatus for carrying out rapid cycle adsorption may be employed. Traditional switch valves are limited in their time to open and close and are therefore unsuitable for rapid cycle adsorption processes. The associated piping volume for an adsorption process utilizing traditional switch valves is larger which reduces process efficiency as cycles become shorter. Rotary valves can move continuously and when properly designed have a smaller associated piping volume, overcoming the two limitations of traditional switch valves. A rotary-valve RCPSA process may be carried out using a rotary-valve adsorption apparatus where the adsorption beds are positioned in a fixed bed assembly and are switched between adsorption steps by rotary feed and product valves that are known in the art. The rotary feed valve effectively replaces all valves corresponding to each bed on the feed side, and the rotary product valve effectively replaces all valves corresponding to each bed on the product side.

The RCPSA process may also be performed using a rotary-bed rapid cycle adsorption unit. For a rotary-bed RCPSA apparatus, the adsorption beds are placed in a rotor assembly that is positioned between first and second stator assemblies, each adsorption bed having a rotor port at either end of the bed via which gas can exit or enter the bed. Where the adsorption process involves counter-current blowdown and purge steps, typically the first stator assembly comprises at least one feed port, at least one exhaust port and a first stator plate having at least one feed slot for directing at least one feed gas stream from the feed port(s) into any of the rotor ports that are in alignment with the slot, and at least one exhaust slot for directing flow of exhaust gas streams from any of the rotor ports that are in alignment with the slot to the exhaust port(s). The second stator assembly comprises at least one product port and a second stator plate having at least one product slot for directing flow of at least one product gas stream between the product port(s) and any of the rotor ports that are in alignment with the slot, and at least one purge slot for directing flow of at least one purge gas into any of the rotor ports that are in alignment with the slot. The rotor assembly is rotated relative to the first and second stator assemblies so as to change the operating modes of individual adsorption beds by changing which rotor ports are in alignment with which slots in the first and second stator plates. When the rotor ports of a bed are in alignment with a feed slot and/or a product slot that bed is in re-pressurization mode or feed mode, when the rotor ports of a bed are in alignment with an exhaust slot and a purge slot that bed is in purge mode, and when the rotor ports of a bed are in alignment with an exhaust slot and are not in alignment with a purge slot it is in blowdown mode.

A person of skill in the art will typically choose between a rotary bed and a rotary valve rapid cycle adsorption unit based on economics of scale and the number of beds required for a given separation. Smaller flow rates and smaller beds favor the rotary bed configuration and larger flow rates and larger beds favor rotary valves with fixed beds.

The number of beds in the RCPSA unit reflects a trade-off between capital expenditure and process efficiency. For example, more beds may provide a higher recovery of light gas (such as hydrogen) with additional equalization steps, but process economics will determine the upper bound on the number of beds. Overall recovery of the adsorption process may decrease when the feed has a greater light gas concentration due to higher losses in the voids, but adding recycle and/or rinse steps would boost overall recovery of the light gas. For the present application, in which high recovery is needed and there is a relatively high concentration of light gas in the feed gas stream, the optimum number of beds is typically between 6 and 9 inclusive.

Figure 10:
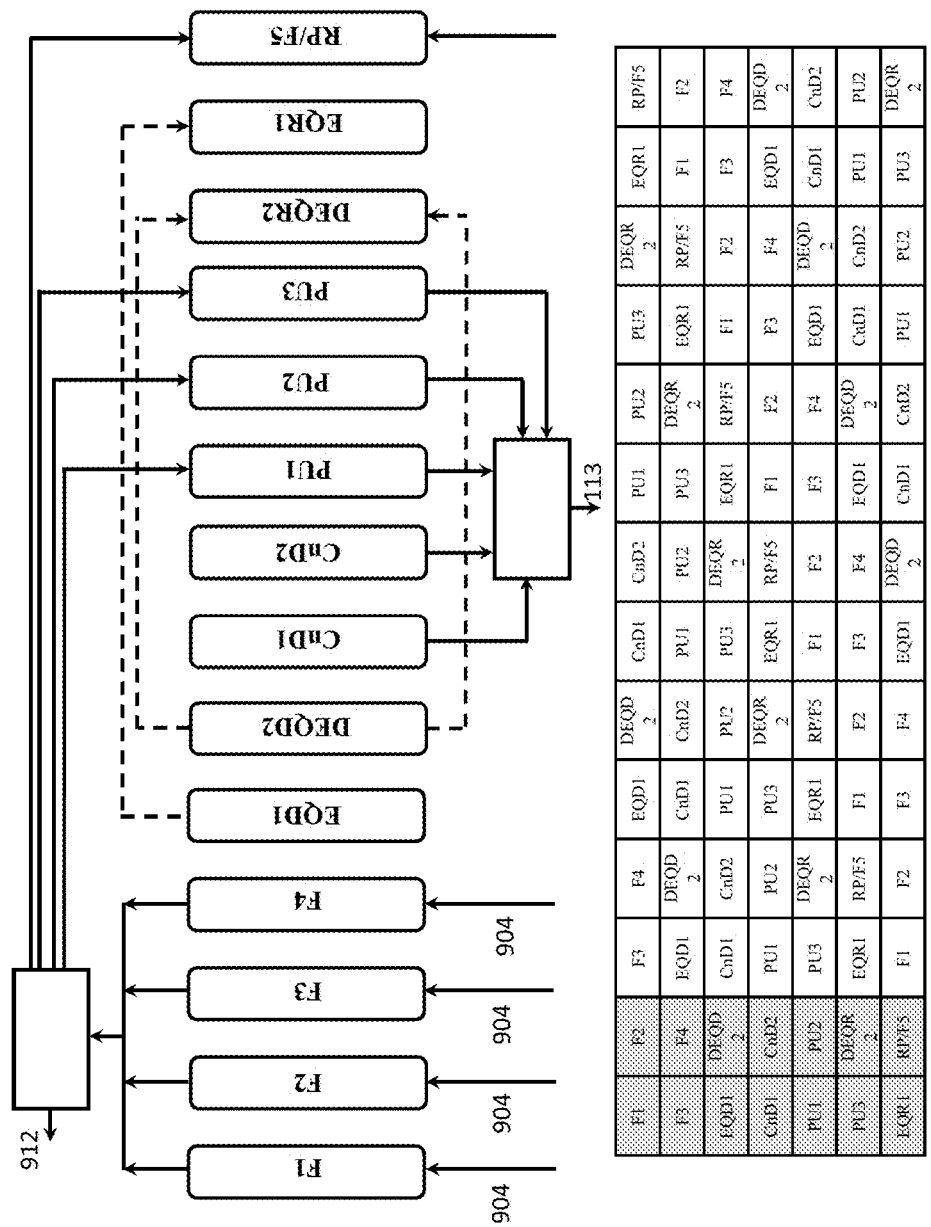
FIG. 10 is a diagram depicting the cycle for a rapid cycle PSA process.

The cycle used for the RCPSA is shown in greater detail in FIG. 10, a time series of the steps a single bed experiences over the course of a single cycle in a 7-bed RCPSA process. The table shows the sequence with each bed in a row and each cycle step in a column. This process comprises feed (F1 to F4), co-current equalization depressurization 1 (EQD1), dual equalization depressurization 2 (DEQD2), counter-current depressurization (CnD1 and CnD2), counter-current product purge (PU1 to PU3), dual equalization re-pressurization 2 (DEQR2), counter-current equalization re-pressurization 1 (EQR1) and product & feed re-pressurization (RP/F5) steps.

In the feed steps F1 to F4, assuming that the bed has been previously pressurized to the highest-pressure level of the cycle, the feed gas mixture is introduced to the inlet end of the bed and the un-adsorbed gas is discharged from the outlet end of the bed. The feed step is continued until the mass transfer zone (MTZ) of preferentially adsorbed component reaches the exit end of the bed without substantially breaking through it.

In the co-current equalization depressurization step 1 (EQD1), at the termination of the feed step, the bed is connected with another bed undergoing step EQR1 (described below). A portion of the void as well as desorbed gas is transferred from the product (exit) end of the bed in the EQD1 step to the product (exit) end of another bed in the EQR1 step, thus lowering the bed pressure in EQD1 to a first intermediate level.

In the dual equalization depressurization step 2 (DEQD2), following EQD1, the bed is depressurized to a second intermediate pressure level by connecting it with another bed undergoing step DEQR2 (described below). The effluent containing void as well as desorbed gases are transferred from the bed in DEQD2 into another bed in DEQR2 through feed (inlet) and product (exit) ends. For an equilibrium controlled RCPSA process, it is not necessary to use dual end equalization step.

In the counter-current depressurization steps 1 and 2 (CnD1 and CnD2), following DEQD2, the bed is depressurized through the feed (inlet) end counter-currently to or near ambient pressure level. The effluent containing more selectively adsorbed species is withdrawn as a secondary product.

In the counter-current product purge steps 1 to 3 (PU1 to PU3), upon termination of the counter-current depressurization step, the purge gas is introduced to the product (exit) end of the bed and the effluent is collected as secondary product from feed (inlet) end of the bed.

In the dual equalization re-pressurization step 2 (DEQR2), following the purge steps, the bed pressure is brought back up to a second intermediate level (as described with DEQD2 step) by introducing the void as well as desorbed gases from another bed undergoing DEQD2. This is again a dual end pressure transfer mode.

In the counter-current equalization re-pressurization step 1 (EQR1), following DEQR2, the bed pressure is brought back to a first intermediate level (as described with EQD1 step) by introducing the void as well as desorbed gases from another bed undergoing EQD1. Notice that the gas is transferred through the product (exit) end of the bed.

Finally, in the product & feed re-pressurization steps (RP/F5), the bed pressure is brought back to the feed or highest-pressure level of the cycle for initiation and the cycle is repeated. This step is initiated through introducing feed gas and part of the primary product gas from feed (inlet) and product (exit) ends, respectively.

In this RCPSA cycle two beds are continuously fed; therefore the product withdrawal is continuous. Flow fluctuation in feed and product streams can be reduced/eliminated due to the multi-bed nature of this process.

Figure 11:
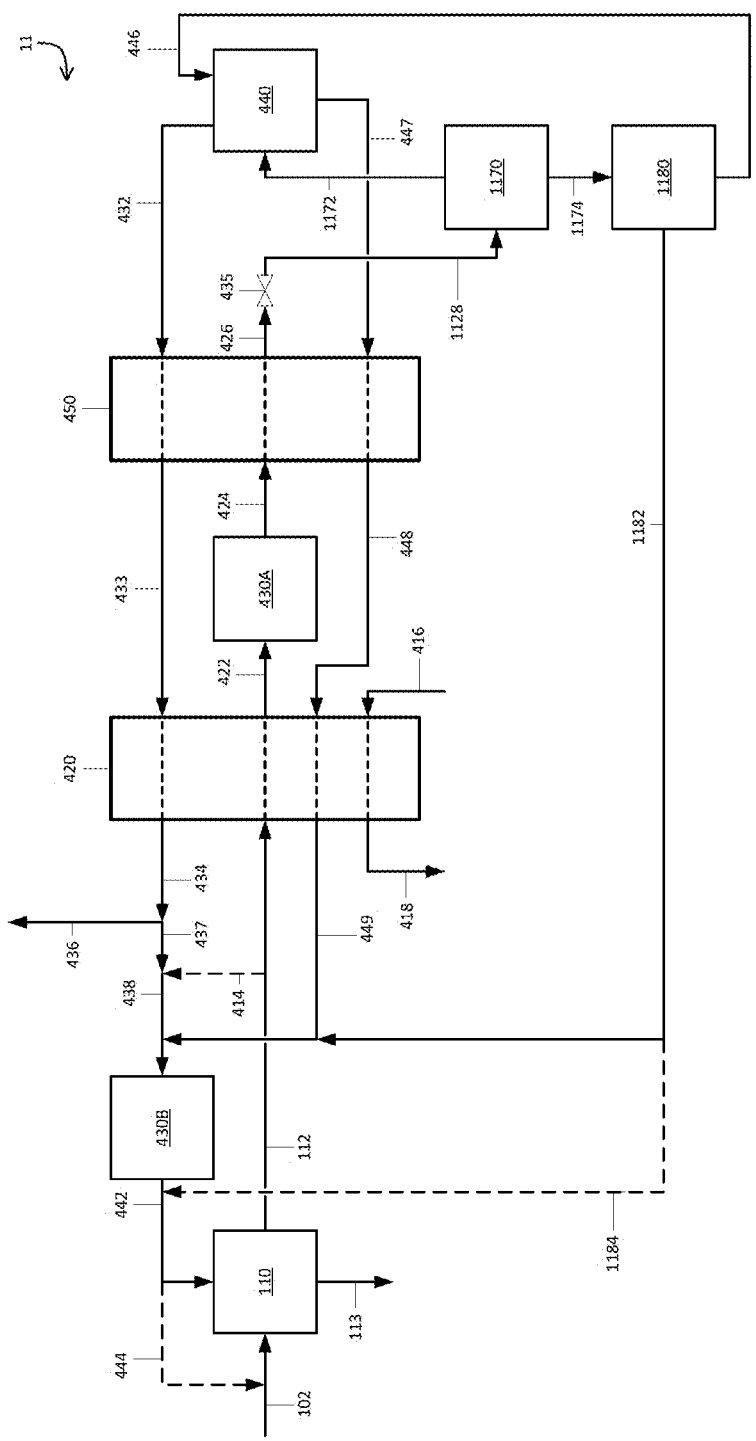
FIG. 11 is a diagram depicting a modification of FIG. 4 in which a hydrogen liquefier is integrated with the hydrogen purification process.

The cryogenic wash column allows high purities of hydrogen to be achieved and is ideal for large consumers that have an onsite liquid hydrogen tank. For applications where a liquid hydrogen tank is not available, a process is required that generates liquid hydrogen for the CWC. One such cycle is shown in FIG. 11 that modifies the cold end of process 4 in FIG. 4. In process 11 pure hydrogen stream 424 is cooled to about 30 K in second heat exchanger 450 and let down in pressure across valve 435 to produce a partially condensed pure hydrogen stream 1128. The partially condensed pure hydrogen stream is separated in separator 1170 to produce a pure hydrogen vapor stream 1172 that enters the cryogenic wash column 440 and a pure hydrogen liquid stream 1174 that enters a liquid phase adsorption process 1180. The liquid-pase adsorption process 1180 operates in the same fashion with the same selection of adsorbents as the online adsorber 130A, and may be regenerated with a liquid-phase adsorbent regeneration gas comprising at least a portion of the hydrogen feed stream 112 and/or at least a portion of the ultra-pure hydrogen stream 436. The liquid-phase adsorption process 1180 may also be performed on a dense-phase pure hydrogen stream that is below the critical temperature but above the critical pressure.

The concentration of impurities in the pure hydrogen liquid stream 1174 is reduced in the liquid-phase adsorption process 1180 from between 100 and 500 ppb to less than 30 ppb, resulting in the liquid hydrogen wash stream 446 used in the top of the CWC 440. When the liquid phase adsorbent is regenerated using a portion of the ultra-pure hydrogen stream 432, the first warmed ultra-pure hydrogen stream 433, and/or the ultra-pure hydrogen stream 434 (not shown), the spent liquid-phase adsorbent regeneration gas 1182 may be used to regenerate the loaded adsorber 430B. At least a portion of the spent liquid-phase adsorbent regeneration gas 1182 may be divided to form spent regeneration fraction 1184 and combined with spent regeneration gas 442 and either used as the purge gas for the hydrogen enrichment system 110 and/or combined with the crude hydrogen stream 102 as second spent regeneration gas 444.

Figure 12:
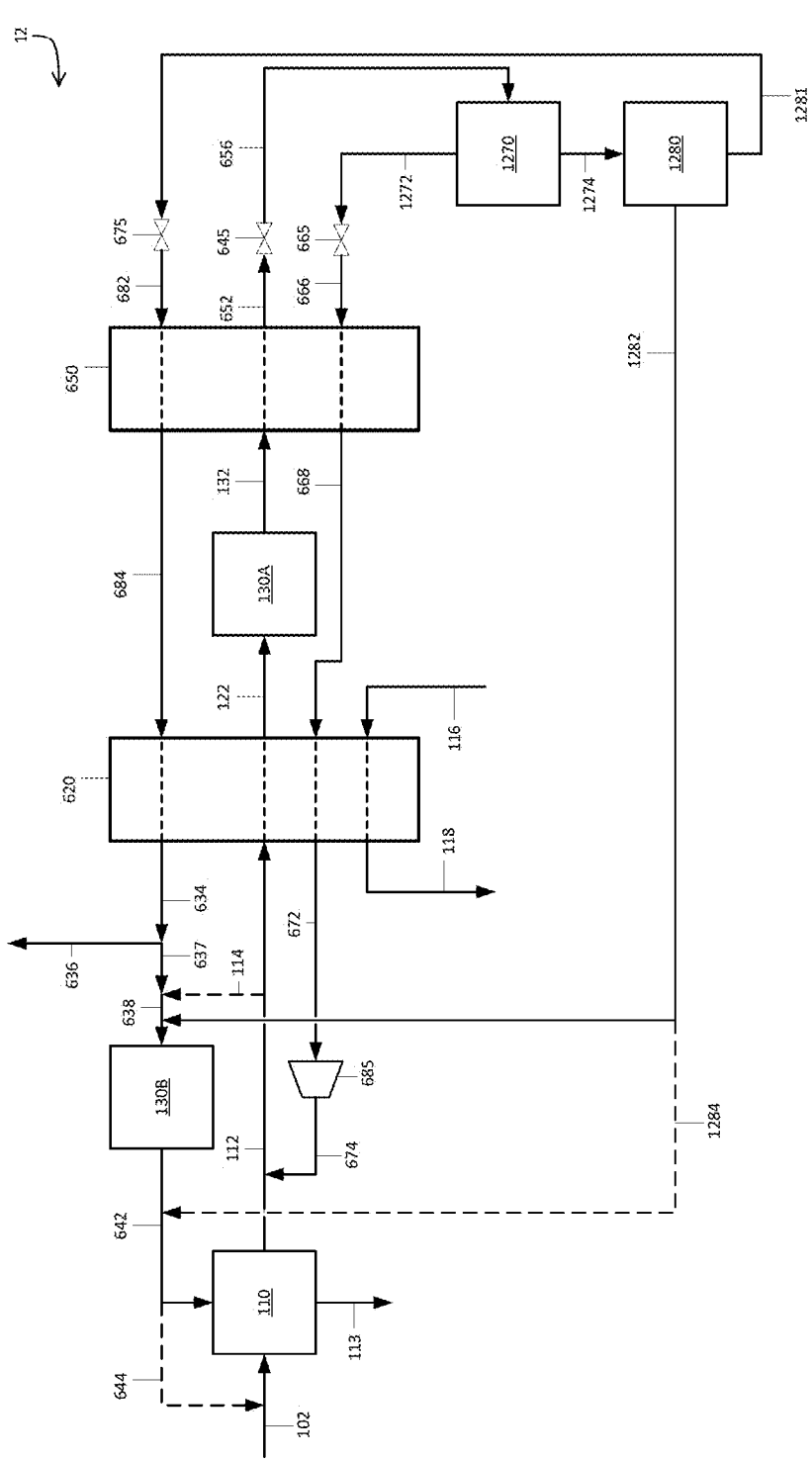
FIG. 12 is a diagram depicting a modification of FIG. 1 in which a hydrogen liquefier is integrated with the hydrogen purification process.

Integrated production of liquid hydrogen can also be effective for cycles without a CWC, as illustrated in FIG. 12. Process 12 is a modification of process 6 in which the pure hydrogen stream 132 leaving the onstream adsorber 130A is cooled in second heat exchanger 650 and reduced in pressure across valve 645, producing partially condensed pure hydrogen stream 656. The partially condensed pure hydrogen stream 656 is separated in separator 1270 to produce a pure hydrogen vapor stream 1272 and a pure hydrogen liquid stream 1274. The pure hydrogen vapor stream 1272 may be reduced in pressure across valve 665 to produce hydrogen recycle stream 666. As in FIG. 6, hydrogen recycle stream 666 may provide refrigeration to second heat exchanger 650 and first heat exchanger 620 before being compressed in compressor 685 and combined with the hydrogen feed stream 112. The pure hydrogen liquid stream 1274 enters a liquid phase adsorption process 1280 as in FIG. 11.

The concentration of impurities in the pure hydrogen liquid stream 1274 is reduced in the liquid phase adsorption process 1280 from between 50 and 100 ppb to less than 1 ppb, resulting in an ultra-pure liquid hydrogen stream 1281 that may be reduced in pressure across valve 675 before being warmed in second heat exchanger 650 and first heat exchanger 620 to yield the ultra-pure hydrogen product 634. Compared to FIG. 11, the concentration of impurities in the pure hydrogen stream 656 that feeds the liquid phase adsorption process 1280 is lower in the embodiment in FIG. 12 due to operating the online adsorber 130A to lower recovery and/or deeper regeneration. As in FIG. 11, the spent regeneration gas 1282 may be used to regenerate the loaded adsorber 130B. At least a portion of the spent regeneration gas 1182 may be divided to form spent regeneration fraction 1184 and combined with spent regeneration gas 642 and recycled to the hydrogen enrichment system 110.

Figure 13:
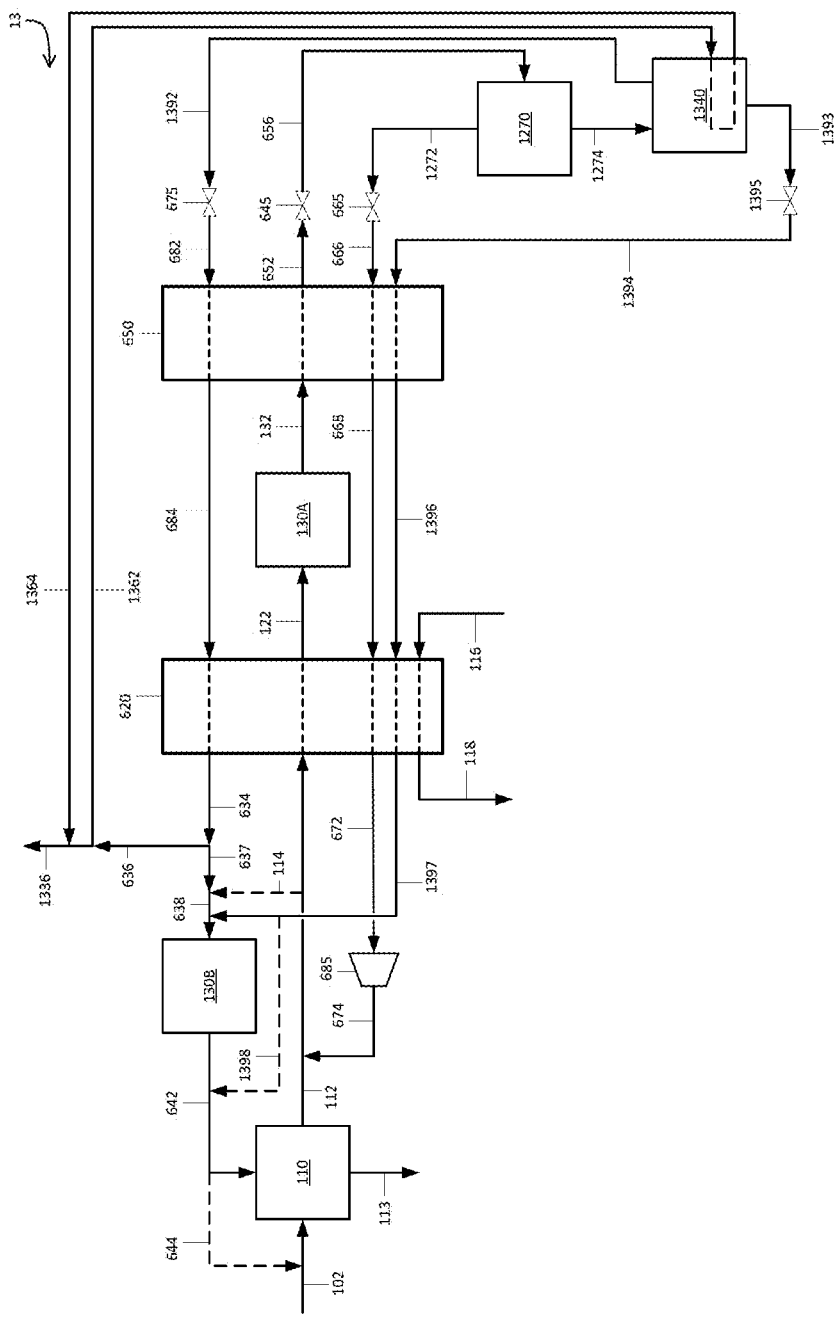
FIG. 13 is a diagram depicting a modification of FIG. 12 in which a hydrogen stripping column uses a portion of the ultra-pure hydrogen product for reboiler duty.
Figure 14:
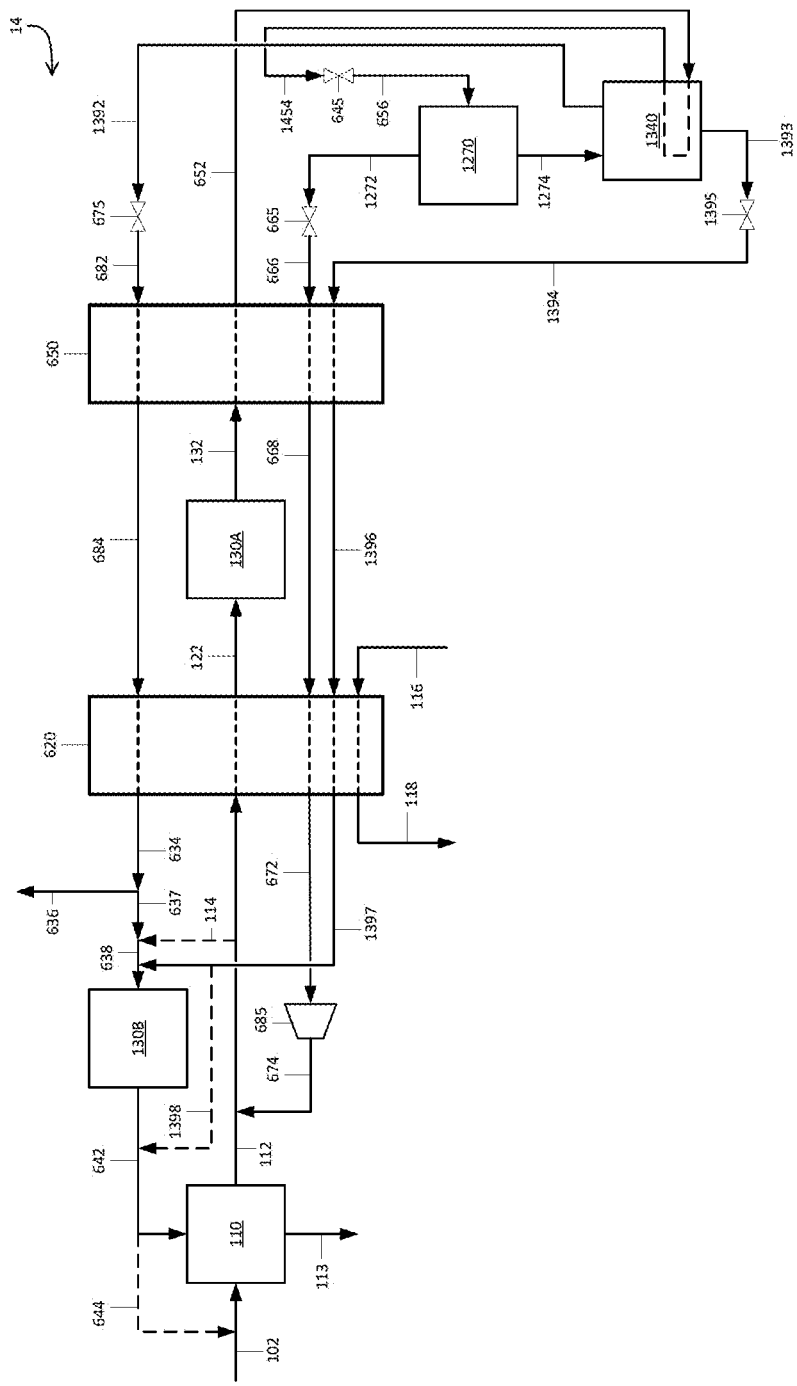
FIG. 14 is a diagram depicting a modification of FIG. 12 in which a hydrogen stripping column uses at least a portion of the pure hydrogen stream for reboiler duty.

Integrated hydrogen liquefaction can also allow the operation of a hydrogen stripping column with liquid hydrogen feed and a reboiler. Two embodiments of this invention are shown in FIGS. 13 and 14 which are modifications of process 12 in FIG. 12. Processes 13 and 14 are the same as process 12 up to the separator 1270. In FIGS. 13 and 14 the pure hydrogen liquid stream 1274 enters the top of a hydrogen stripping column 1340 that comprises a reboiler. An ultra-pure hydrogen vapor stream 1392 exits the top of the hydrogen stripping column 1340 and may be reduced in pressure before being warmed in second heat exchanger 650 and first heat exchanger 620 to form ultra-pure hydrogen product 636. A liquid hydrogen effluent stream 1393 exits the bottom of the hydrogen stripping column 1340 and may be reduced in pressure across valve 1395 before being warmed and vaporized in second heat exchanger 650 and first heat exchanger 620 to form warmed hydrogen effluent 1397. Similarly to FIG. 12, the warmed hydrogen effluent 1397 may be used to regenerate the loaded adsorber 130B. At least a portion of the warmed hydrogen effluent 1397 may be divided to form warmed hydrogen effluent fraction 1398 and combined with spent regeneration gas 642 and recycled to the hydrogen enrichment system 110.

The source of the reboiler duty is the difference between FIGS. 13 and 14. In FIG. 13 a portion of the ultra-pure hydrogen product 636 is divided to form a first ultra-pure hydrogen fraction 1336 and a second ultra-pure hydrogen fraction 1362. The second ultra-pure hydrogen fraction 1362 may be used to provide reboiler duty by indirect heat exchange to the hydrogen stripping column 1340. The returning cooled second ultra-pure hydrogen fraction 1364 is then combined with the first ultra-pure hydrogen fraction 1336 to form the ultra-pure hydrogen product. In FIG. 14 the cooled pure hydrogen stream 652 provides the reboiler duty before expanding across valve 645 to form partially condensed pure hydrogen stream 656.

Figure 15:
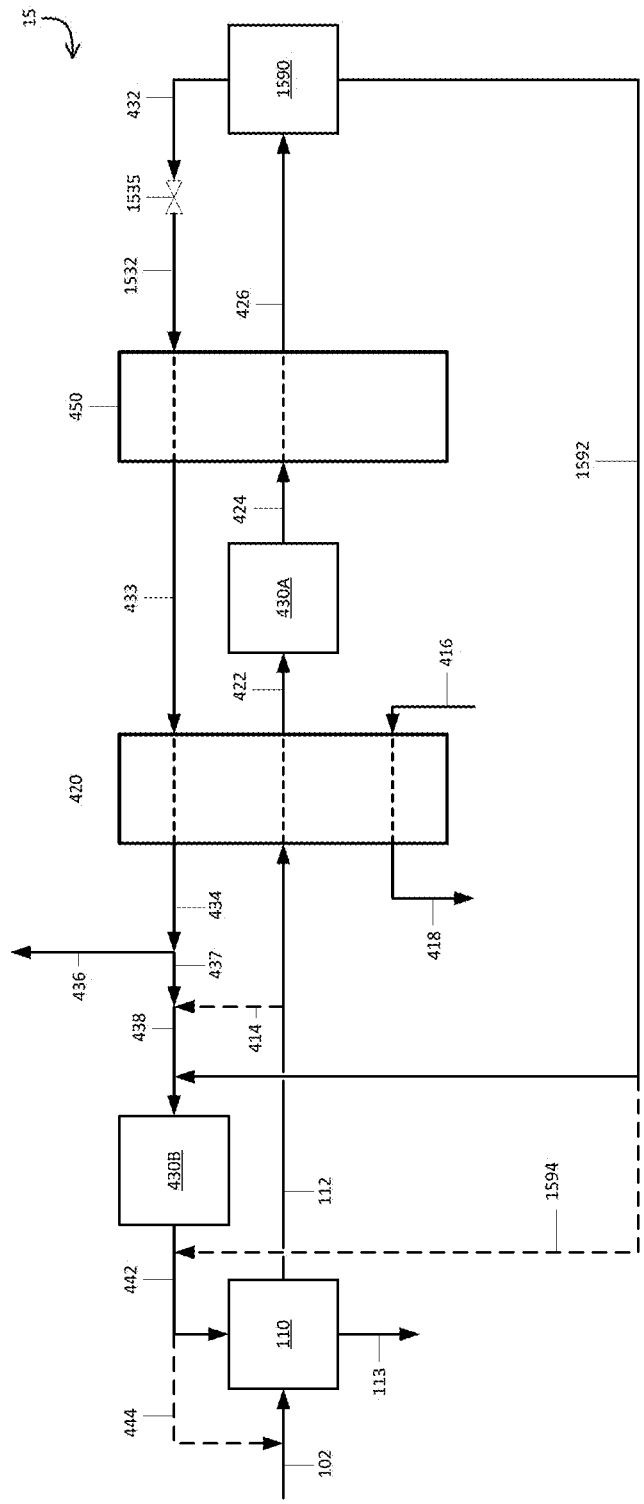
FIG. 15 is a diagram depicting an embodiment of a hydrogen purification process comprising two CTSA processes in series.

FIG. 15 shows a modification of the process 4 in FIG. 4 in which the cryogenic wash column is replaced with a second CTSA. Process 15 cools pure hydrogen stream 424 in second heat exchanger 450 to around 30-35 K to produce cooled pure hydrogen stream 426. The cooled pure hydrogen stream 426 is passed through a second stage online adsorber 1590 in which the concentration of impurities is reduced from 50 to 100 ppb to less than 1 ppb, resulting in ultra-pure hydrogen stream 432. The ultra-pure hydrogen stream 432 may be reduced in pressure across valve 1535 to provide refrigeration to second heat exchanger 450 and first heat exchanger 420. Additional refrigeration may be provided with external refrigeration such as liquid nitrogen and/or liquid hydrogen. As in FIG. 11, when the second stage online adsorber 1590 is regenerated, a spent regeneration gas 1592 may be used to regenerate the loaded adsorber 430B. At least a portion of the spent regeneration gas 1592 may be divided to form spent regeneration fraction 1594 and combined with spent regeneration gas 442 and recycled to the hydrogen enrichment system 110. In the embodiment illustrated in FIG. 15, the second stage online adsorber 1590 is regenerated at ambient temperature, however in practice it may be regenerated between 200 K and ambient. For the cases when the spent regeneration gas 1592 is at a sub-ambient temperature the spent regeneration gas 1592 may provide refrigeration to the second heat exchanger 450 and/or the first heat exchanger 420.

Purification of hydrogen is significantly more complicated by the presence of oxygen in trace amounts. These types of feeds may result from electrolysis of water or recycle of hydrogen. Accumulation of oxygen in the system threatens to provide a hydrogen-rich stream with enough oxygen to exceed the lower explosive limit (LEL) of 4% by volume and present an unacceptable explosion hazard. The key points of concern would be the tail gas for a PSA, the regeneration stage of a CTSA, and the liquid effluent of a CWC.

Figure 16A:
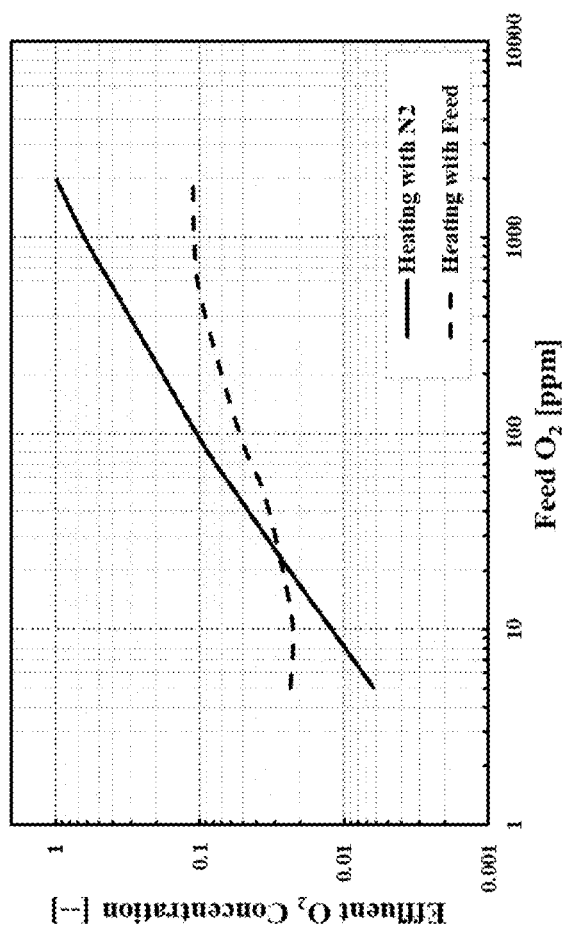
FIG. 16A is a plot of oxygen concentration in the spent regeneration gas from a CTSA as a function of oxygen concentration in the feed to the CTSA.

The concentration of oxygen in the spent regeneration gas stream is plotted as a function of the concentration of oxygen in the hydrogen feed stream 112 in FIG. 16A. The dashed line shows the results for a hydrogen-rich regeneration gas as used in FIG. 1 and the solid line shows the results for a nitrogen-rich regeneration gas. For example, if the feed to a CTSA has 1000 ppm oxygen and the CTSA is regenerated using a fraction of the feed stream 114 as in FIG. 1, the spent regeneration gas stream 142 would form an explosive mixture with about 10% oxygen by volume in bulk hydrogen. This, of course, must be prevented. The hydrogen feed stream 112 must have an oxygen content below 50 ppm to maintain a safe operating margin when regenerating with a hydrogen-rich stream.

Figure 16B:
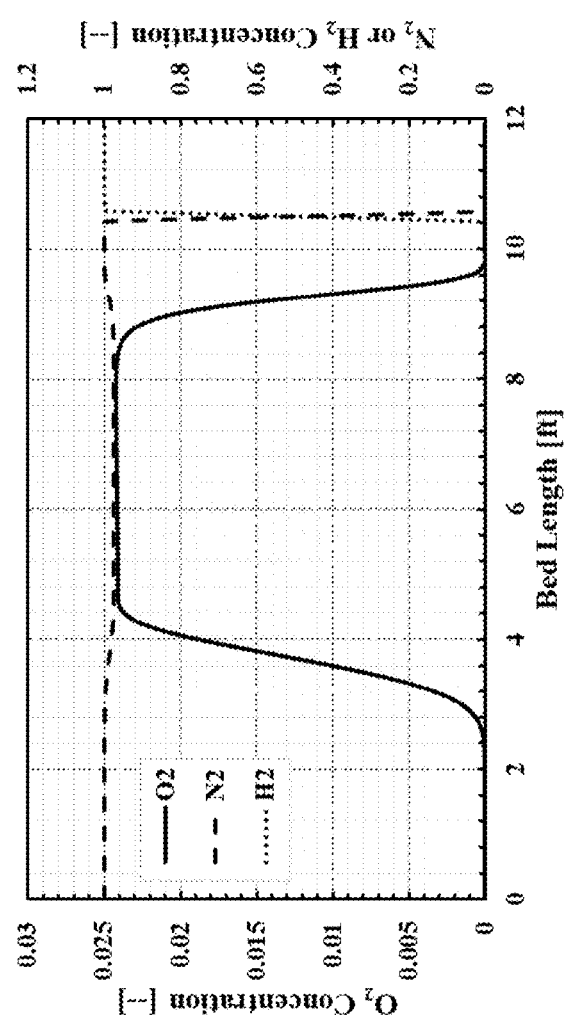
FIG. 16B is a plot of the concentration profiles of hydrogen, oxygen, and nitrogen over the length of a CTSA bed during regeneration.

FIG. 16A shows that when the hydrogen feed stream 112 has more than 20 ppm oxygen, the amount of oxygen in the spent regeneration gas is higher when nitrogen is used to regenerate the loaded adsorber 130B. At first glance this would disqualify nitrogen for use as a regeneration gas, but a closer look at FIG. 16B reveals a benefit to using the inert gas. In FIG. 16B a profile along the loaded adsorber is shown for a nitrogen regeneration gas, and it can be seen that the nitrogen sweeps the hydrogen ahead of the oxygen, separating the two gases along the length of the bed and preventing an explosive mixture from forming. This shows that higher concentrations of oxygen in the hydrogen feed stream 112 are possible when nitrogen is used as a regeneration gas.

Another mitigation strategy is to react the trace oxygen with the bulk hydrogen to create water, driving the reaction by thermal means as in U.S. Pat. No. 7,785,550 or catalytic means as in US 2008/0216652, however this reduces overall hydrogen recovery. U.S. Pat. No. 10,882,742 teaches the use of a PSA to remove oxygen, but in order to prevent the tail gas stream from reaching the LEL, pure hydrogen product is recycled to the PSA feed. This can maintain the oxygen mole fraction in the tail gas below 1% by volume, but at the cost of increased overall power demand and equipment size due to the large amount of recycle flow in the system. Even adding a catalytic oxygen removal step to the tail gas stream does not reduce the cost of hydrogen purification to an acceptable level.

Figure 17A:
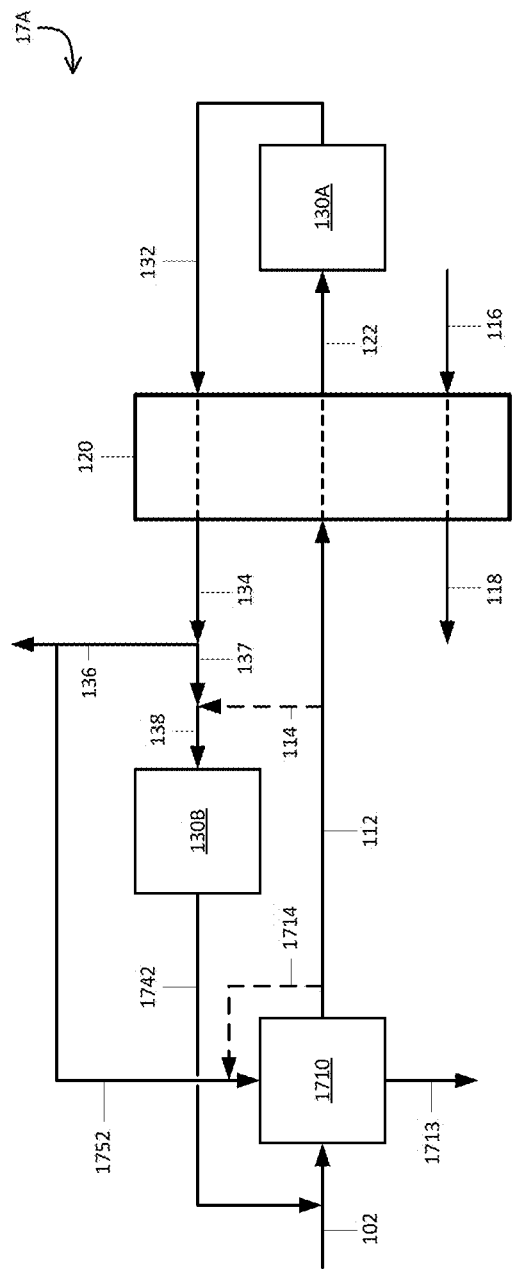
FIG. 17A is a diagram depicting a modification of FIG. 1 in which oxygen is removed during the hydrogen enrichment step.

To overcome these challenges, process 1 in FIG. 1 is modified into process 17A shown in FIG. 17A. A hydrogen enrichment system 1710 removes oxygen wherein the hydrogen enrichment system 1710 may comprise a catalytic oxygen remover, also known as a deoxo process, followed by a dehydration step, typically a TSA, to remove water generated by the reaction. The deoxo process typically relies on reacting the oxygen with the bulk hydrogen at a temperature between 50 and 300° C. over a palladium catalyst to produce water. Because the reaction of hydrogen and oxygen generates significant heat, this process can be dangerous if not controlled properly. The TSA dehydrator also requires regeneration with a hydrogen-rich stream. Spent regeneration gas 1713 leaving the hydrogen enrichment system 1710 may be recycled or vented.

Alternatively, the hydrogen enrichment system 1710 may instead comprise a TSA getter in which an adsorbent is used that has good adsorption of oxygen in the presence of bulk hydrogen. The TSA getter may be operated at near-ambient temperatures between 0 and 50° C., or between 25 and 35° C., to prevent reacting the oxygen with the hydrogen. Acceptable adsorbents include copper oxide, manganese oxide, and copper oxide/manganese oxide mixtures also known under the trade name Hopcalite. Copper oxide/ manganese oxide mixtures are surprisingly effective at adsorbing oxygen at ambient temperatures without reacting with hydrogen to form water. Avoiding water formation in the TSA getter eliminates the need for an additional dehydration step for the hydrogen feed stream 112 prior to cooling in heat exchanger 120.

A hydrogen-containing stream is then passed over the spent adsorbent at an elevated temperature between 150 and 300° C., or between 170 and 200° C., to react with the adsorbed oxygen to produce water and reduce the spent adsorbent. The spent regeneration gas 1713 may be recycled or vented as previously described. The regeneration gas required by the hydrogen enrichment system 1710 may be provided by dividing a portion of the pure hydrogen product stream 136 to form a pure regeneration gas stream 1752 and/or by dividing a portion of the hydrogen feed stream 112 to form a feed regeneration gas stream 1714.

The hydrogen feed stream 112, having been reduced in oxygen content below 50 ppm, can be purified in the same manner as in FIG. 1. The only difference comes with the spent regeneration gas stream 1742 which is recycled to combine with the crude hydrogen stream 102.

Figure 17B:
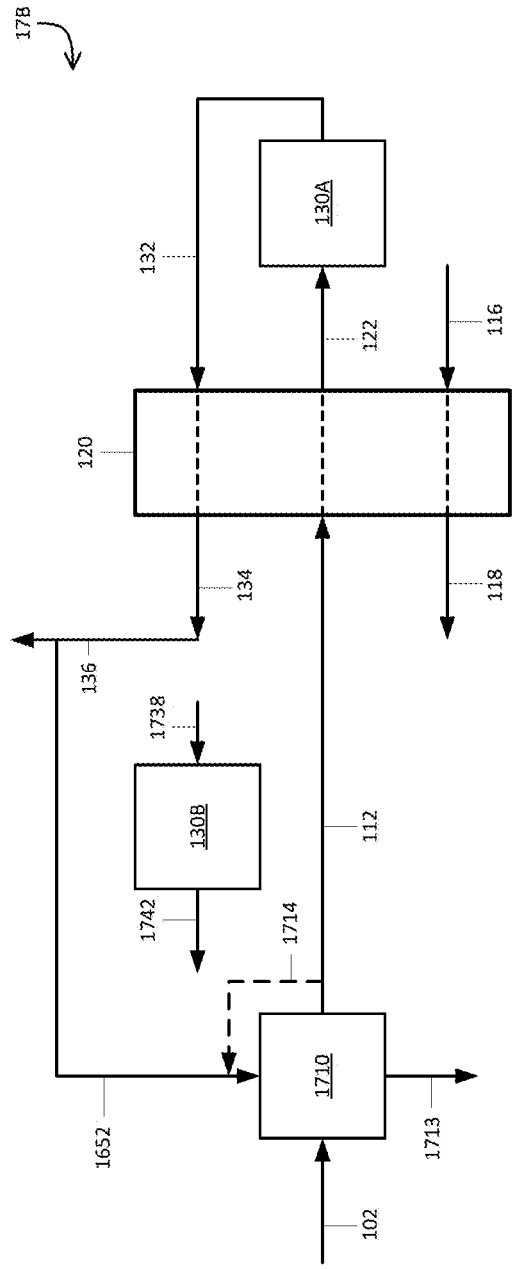
FIG. 17B is a diagram depicting a modification of FIG. 17A in which the CTSA is regenerated using nitrogen.

A modification of FIG. 17A is shown as FIG. 17B for the case in which the hydrogen enrichment system 1710 produces a hydrogen feed stream 112 that has more than 50 ppm oxygen. This looser oxygen specification could allow a smaller hydrogen enrichment system 1710 with lower capital and operating costs. In process 17B the loaded adsorber 130B is regenerated by passing an inert regeneration gas 1738 such as nitrogen, argon, or any other gases that do not react with oxygen or hydrogen over the adsorbent. The spent regeneration gas 1742 is mostly inert gas and may be vented.

Figure 18:
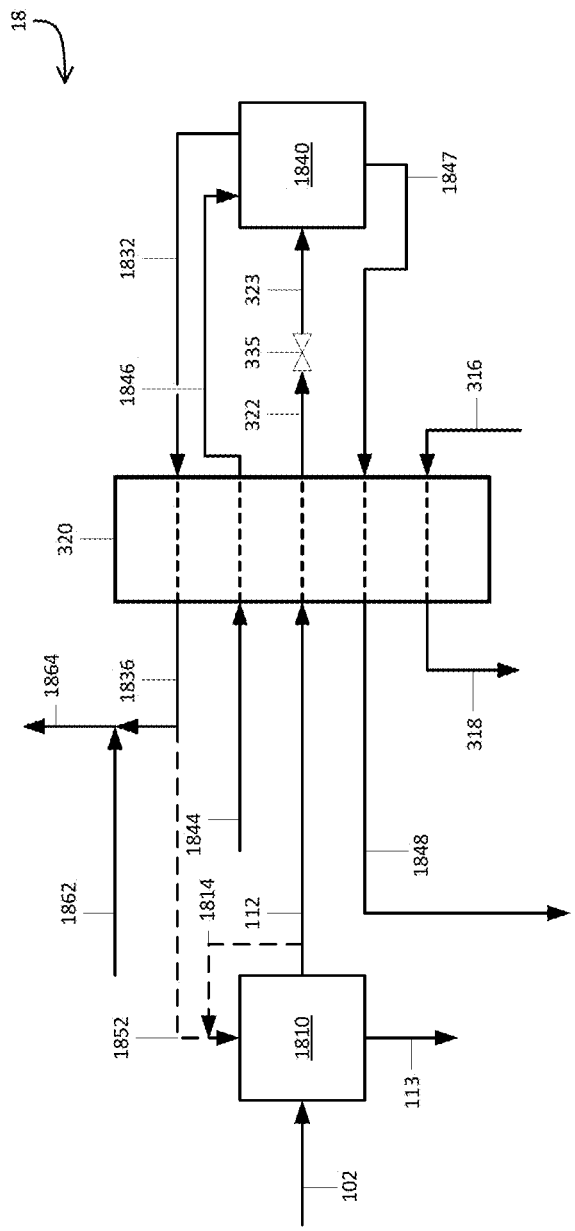
FIG. 18 is a diagram depicting a modification of FIG. 3 in which oxygen is removed during the hydrogen enrichment step and the hydrogen feed stream is washed with liquid nitrogen.

One potential application for hydrogen with trace oxygen is in the production of ammonia. There is a demand for hydrogen from renewable electricity, but transportation of hydrogen is costly and difficult. One alternative is to electrolyze water using renewable energy to make hydrogen that is then converted to ammonia, which is easily transported as a liquid. A process 18 to purify hydrogen for ammonia production is shown in FIG. 18, which is a modification of FIG. 3. As in FIGS. 17A and 17B, a crude hydrogen stream 102 comprising oxygen is fed to a hydrogen enrichment system 1810 to remove oxygen, wherein the hydrogen enrichment system 1810 may comprise a catalytic oxygen remover followed by TSA dehydration, or a TSA getter. Also as in FIGS. 17A and 17B, the regeneration gas for the hydrogen enrichment system 1810 may be provided by dividing a portion of the pure hydrogen product stream 336 to form a pure regeneration gas stream 1852 and/or by dividing a portion of the hydrogen feed stream 112 to form a feed regeneration gas stream 1814.

The hydrogen feed stream 112 is cooled in heat exchanger 320 and may be reduced in pressure across valve 335 to further cool the stream. The cooled hydrogen stream 323 is contacted with liquid nitrogen stream 1846 in a cryogenic wash column 1840 to further remove oxygen. The liquid nitrogen stream 1846 may be supplied by cooling and condensing a first nitrogen gas stream 1844, or may be supplied from a liquid nitrogen tank (not shown). The liquid nitrogen effluent stream 1847 is warmed in the heat exchanger 320 to provide refrigeration and then may be vented as gaseous nitrogen effluent stream 1848. The hydrogen overhead stream 1832 is also warmed in the heat exchanger 320 to produce warmed hydrogen overhead 1836. There is a significant amount of nitrogen present in the warmed hydrogen overhead 1836 having boiled off of the liquid nitrogen stream 1846 in the cryogenic wash column 1840, however this is not considered an impurity as the feed to an ammonia process will typically be near the stoichiometric mixture of 75% hydrogen and 25% nitrogen. A second nitrogen gas stream 1862 may be combined with the warmed hydrogen overhead 1836 to form the ammonia plant feed stream 1864 with the desired ratio of hydrogen to nitrogen.

Example 1

Figure 19A:
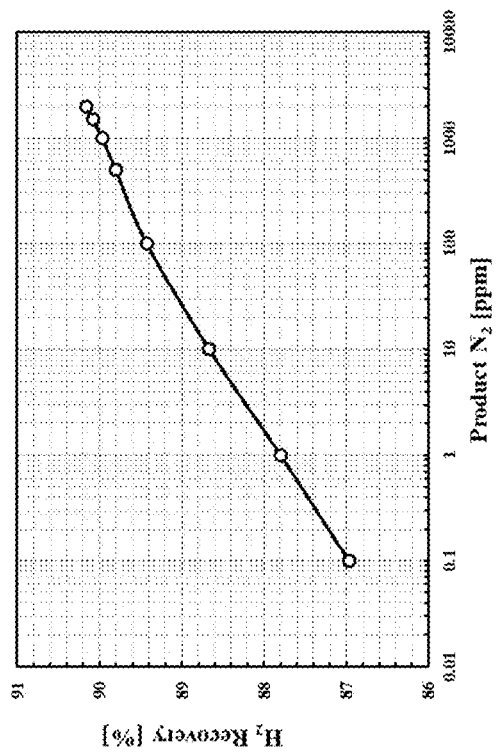
FIG. 19A is a plot of PSA hydrogen recovery as a function of nitrogen concentration in the hydrogen feed stream.
Figure 19B:
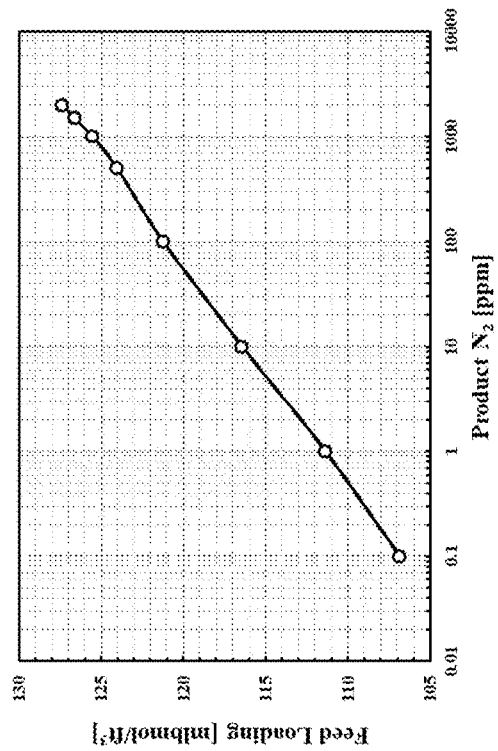
FIG. 19B is a plot of PSA feed loading as a function of nitrogen concentration in the hydrogen feed stream.

A sensitivity study of the PSA which could serve as the hydrogen enrichment system in FIG. 1 was carried out using proprietary software that solves the heat, mass, and momentum balances in an adsorption bed. This software package was used for all examples to come. Crude hydrogen 102 from a SMR process containing 0.58% N2, 3.87% CH4, 16.5% CO2, 3.98% CO and the balance H2 is sent to a PSA process 110 at a pressure of 26.3 atma and temperature of 104° F. The N2 concentration in the hydrogen feed stream 112 (the product of PSA process 110) was varied and plotted on the x-axis against hydrogen recovery in the PSA process 110 in FIG. 19A and against feed loading in FIG. 19B. Feed loading is defined as moles of impure feed that can be handled by a given bed volume.

Producing a higher purity stream in the PSA process results in a significantly lower H2 recovery (3.2 percent point lower when N2 concentration in product goes from 2000 ppm to 0.1 ppm) and feed loading (about 16% lower when N2 concentration in product goes from 2000 ppm to 0.1 ppm). Therefore, integrating CTSA and/or CWC processes with the PSA process is beneficial in producing high purity hydrogen at high recovery. Note that there is essentially no loss of hydrogen from the downstream unit operations (CTSA or CWC) as the waste streams from those units are recycled to the PSA process. The ultimate process recovery will be controlled by the PSA unit.

Example 2

Figure 20:
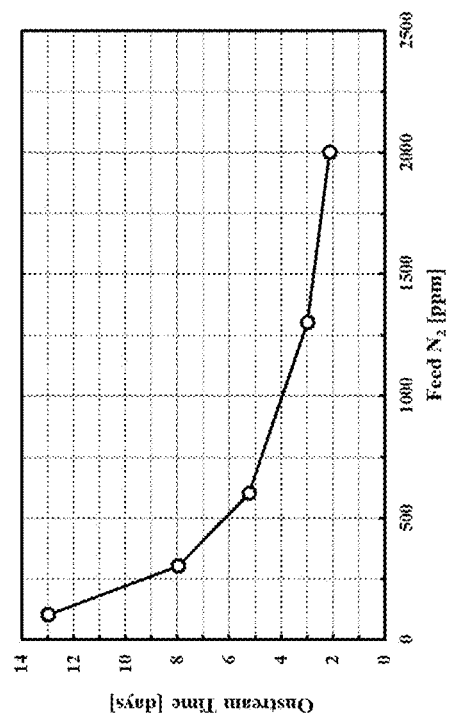
FIG. 20 is a plot of CTSA onstream time as a function of nitrogen concentration in the hydrogen feed stream.

Using the same flow sheet and software package as in Example 1, the balance between purification load between the PSA and the CTSA is explored in FIG. 20. Here the relationship between the concentration of nitrogen in the hydrogen feed stream 112 is plotted against the onstream time of the CTSA in days controlling to 0.5 ppb nitrogen in the pure hydrogen stream 132. The hydrogen feed stream 112 comprises 30 ppm Ar, 30 ppm CO, and 20 ppm CH4, at 80 K and 30.7 atma. For a higher target nitrogen concentration in the pure hydrogen stream 132 the onstream time will be higher, especially useful in arrangements such as FIG. 4 where the CWC can remove impurities.

For higher purity hydrogen leaving the PSA, the CTSA may remain onstream longer before requiring regeneration. From an operational perspective, the minimum acceptable onstream time for the CTSA is about 1.5 days. As seen in FIG. 20, an onstream time of just over 2 days is achievable at a nitrogen concentration in the hydrogen feed stream 112 of 2000 ppm. Example 1 shows that targeting 2000 ppm leaving the PSA allows high hydrogen recovery and feed loading. As mentioned previously, the spent regeneration gas 142 is recycled to the PSA so the overall hydrogen recovery is minimally affected. Lower impurites in the hydrogen feed stream 112 exiting the PSA increase the CTSA onstream time at the cost of lower recovery and feed loading in the PSA.

Example 3

Example 3 addresses proper management of carbon monoxide in the onstream and regeneration modes of the CTSA process as shown in FIG. 1. The same software package is used from Examples 1 and 2. The hydrogen feed stream 112 comprises 100 ppm N2, 30 ppm Ar, and 20 ppm CH4, at 80 K and 30.7 atma. The CTSA is regenerated first with a blowdown step to 1.5 atma over 900 s, then fed with 303 K regeneration gas for 18 h, then fed with pure hydrogen product gas at 80 K and 1.5 atma for 32 h.

Figure 21A:
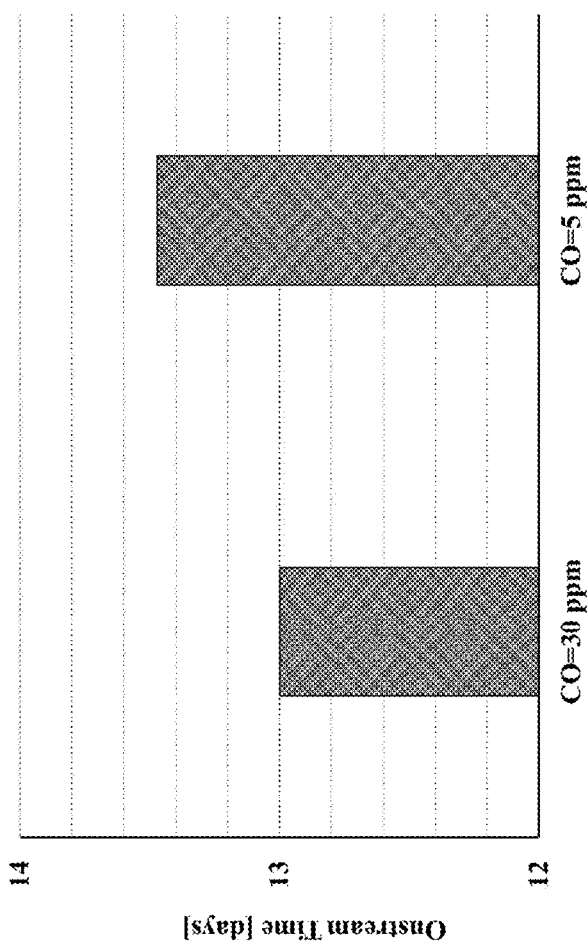
FIG. 21A is a chart plotting the CTSA onstream time for different levels of carbon monoxide in the hydrogen feed stream.
Figure 21B:
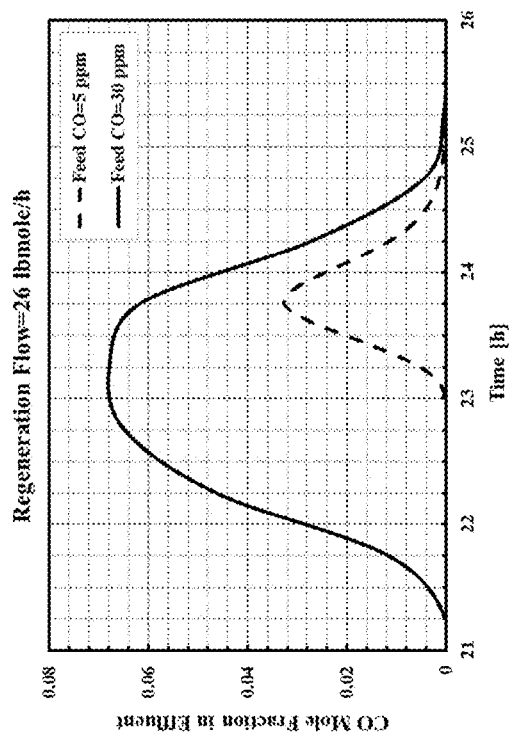
FIG. 21B is a plot of the carbon monoxide concentration in the spent regeneration gas stream leaving the CTSA as a function of time for different levels of carbon monoxide in the hydrogen feed stream.
Figure 21C:
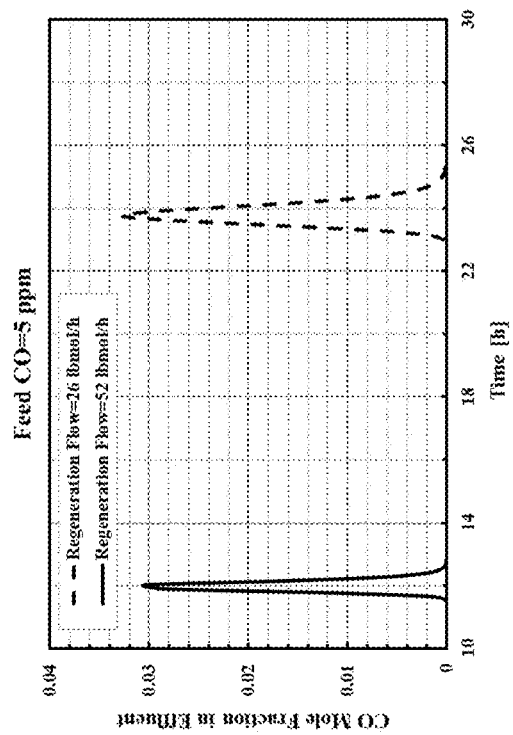
FIG. 21C is a plot of the carbon monoxide concentration in the spent regeneration gas stream leaving the CTSA as a function of time for different flow rates of regeneration gas.
Figure 21D:
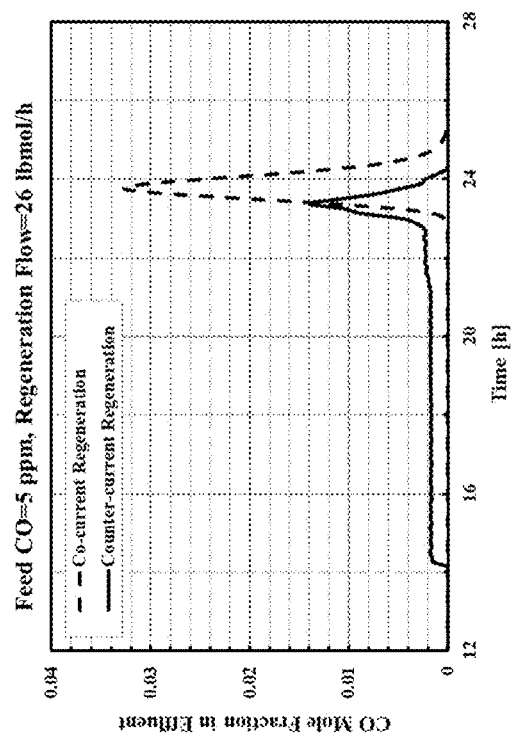
FIG. 21D is a plot of the carbon monoxide concentration in the spent regeneration gas stream leaving the CTSA as a function of time for co-current and counter-current regeneration.

FIG. 21A shows that reducing the concentration of carbon monoxide in the hydrogen feed stream 112 from 30 ppm to 5 ppm has a negligible effect on onstream time. However, some regulatory agencies restrict the venting of certain pollutants, so onstream time is not the only design criteria. For example, southern California restricts venting more than 2000 ppm of CO over a 15 min time period (SCAQMD Rule 407). Modeling of the vent gas during regeneration indicates that increasing feed CO concentration from 5 to 30 ppm to a CTSA process increases the peak concentration during regeneration from 3.2% to 6.8%, respectively, as shown in FIG. 21B. A typical solution to reduce the peak CO concentration would be to dilute it by increasing the amount of regeneration gas used, but as shown in FIG. 21C this only shifts the time the peak occurs, not its magnitude. Regenerating the CTSA counter-currently does reduce the CO spike as shown in FIG. 21D, but the counter-current spike is still well above the regulatory limit.

The present invention avoids violation of the regulatory limit by sending the spent regeneration gas 142 to the PSA where it is further diluted in a surge drum to an acceptable level.

Example 4

Example 4 shows the effect of the concentration of impurities in the hydrogen feed stream 112 on the performance of the CTSA process in FIG. 1. For this case the bed is 8 ft long by 1.5 ft ID and is operated at 9.5 atma, 80 K, and 24.6 lbmol/h feed flow rate. As in Example 2, the outlet pure hydrogen stream 132 is controlled to 0.5 ppb nitrogen.

Figure 22A:
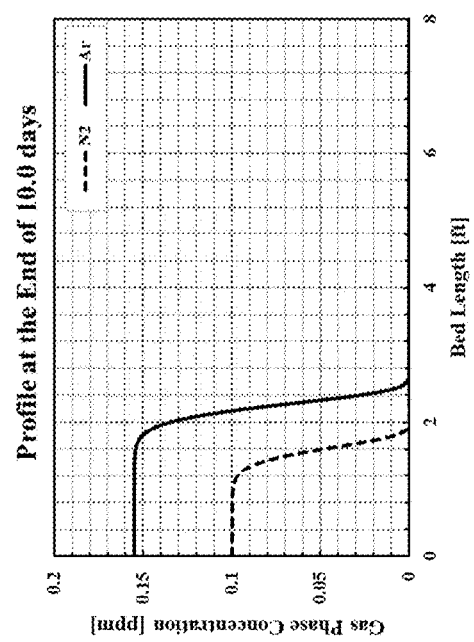
FIG. 22A is a plot of the gas phase concentration profiles of nitrogen and argon over the length of the CTSA bed after 10 days of operation.

FIG. 22A shows the gas phase concentration of nitrogen and argon as a function of position in the onstream bed 130A for a hydrogen feed stream with 0.155 ppm argon and 0.1 ppm nitrogen. After 10 days onstream, there is significant onstream time remaining as the breakthrough point (in this case argon) has not even reached 3 ft of the 8 ft bed length.

Figure 22B:
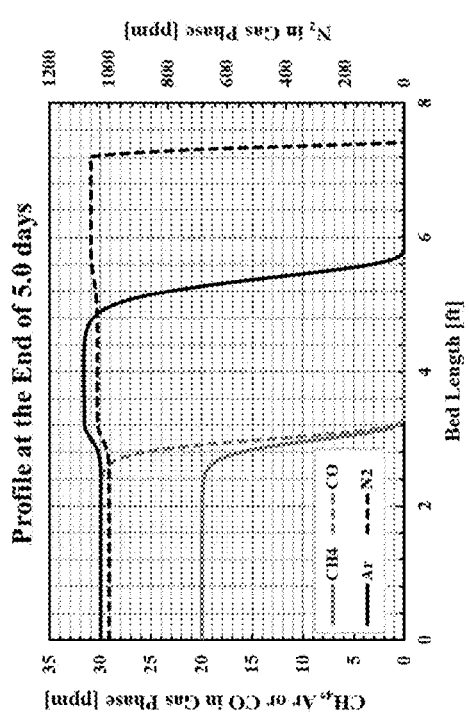
FIG. 22B is a plot of the gas phase concentration profiles of nitrogen, argon, methane, and carbon monoxide over the length of the CTSA bed after 5 days of operation.

FIG. 22B shows the gas phase concentration of nitrogen, argon, carbon monoxide, and methane as a function of position in the onstream adsorber 130A for a hydrogen feed stream with 1000 ppm nitrogen, 30 ppm argon, 30 ppm carbon monoxide, 20 ppm methane, and the balance hydrogen. The higher feed loading compared to FIG. 22A leads to a shorter onstream time. FIG. 22B shows that at 5 days onstream breakthrough of nitrogen is imminent.

Figure 22C:
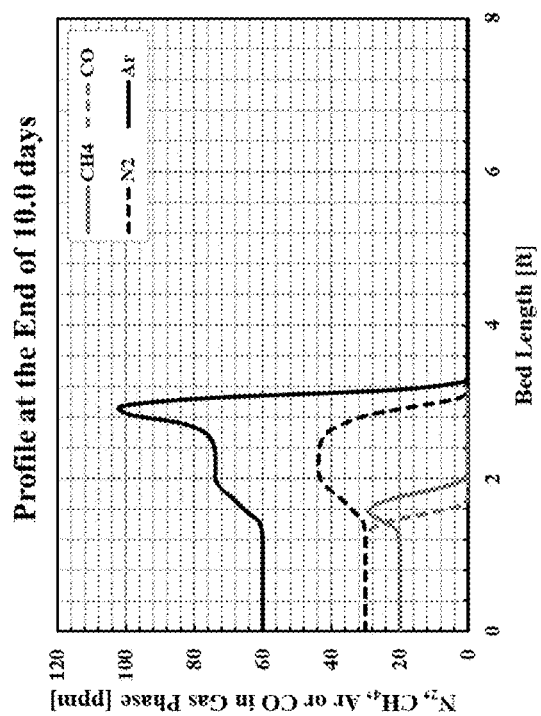
FIG. 22C is a plot of the gas phase concentration profiles of nitrogen, argon, methane, and carbon monoxide over the length of the CTSA bed after 10 days of operation.

FIG. 22C takes the case from FIG. 22B and reduces the nitrogen to 30 ppm and increases the argon to 60 ppm in the hydrogen feed stream. The overall reduction in impurity load increases the onstream time, as it is shown that at 10 days onstream the breakthrough point is still not halfway through the 8 ft bed length. Argon is once again the controlling impurity as it has increased in feed concentration relative to nitrogen as argon is more weakly adsorbed. However, given a high enough partial pressure of nitrogen entering the online adsorber 130A, nitrogen may become the controlling impurity.

Example 5

Figure 23:
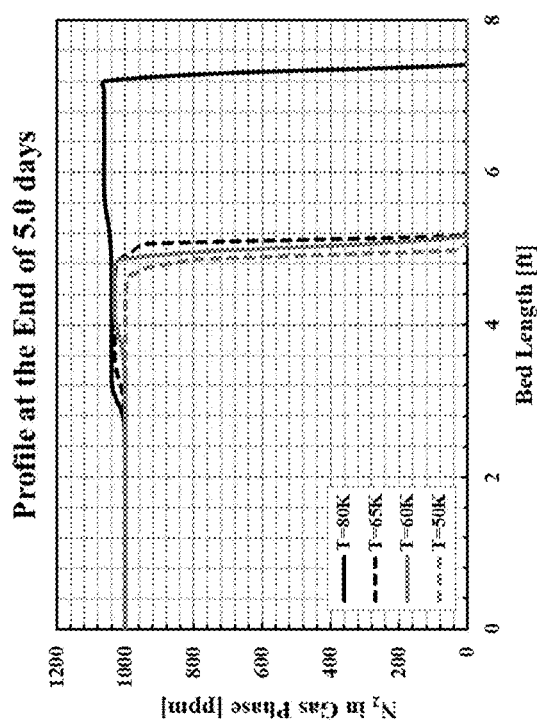
FIG. 23 is a plot of the gas phase concentration profile of nitrogen over the length of the CTSA bed after 5 days of operation for different operating temperatures.

Example 5 explores the effect of the operating temperature of the onstream CTSA bed 130A with the same dimensions, feed pressure, and flow rate of Example 4 and a hydrogen feed stream 112 with 1000 ppm nitrogen, 30 ppm argon, 30 ppm carbon monoxide, and 20 ppm methane. The gas-phase nitrogen concentration as a function of bed length after 5 days onstream is plotted for four operating temperatures in FIG. 23. It can be seen that the decrease from 80 K to 65 K is significant, translating from an onstream time of about 5 days to about 8 days, but further decrease to 50 K has an insignificant effect on onstream time.

Colder operating temperatures between 50 and 65 K allow short cycling, in which shorter onstream times are used to increase the purity of the hydrogen product. For example, at temperatures between 50 and 65 K onstream time of 8 days is possible, so when the onstream time is limited to between 2 and 5 days there will be no measureable impurities in the product. Short cycling may be controlled by using one or more detectors within the onstream bed 130A to measure the concentration of the one or more impurities, and switching from onstream to regeneration when the concentration of the one or more impurities increases in the region between 50% and 75% along the bed length. This mode of operation contrasts with the normal mode of operation in which the online bed would be switched to regeneration mode when the concentration of the one or more impurities increases in the region between 75% and 100% along the bed length. Short cycling also improves operability when switching between online and regeneration modes is performed manually as there is additional buffer space if the switch must be delayed.

Example 6

Figure 24:
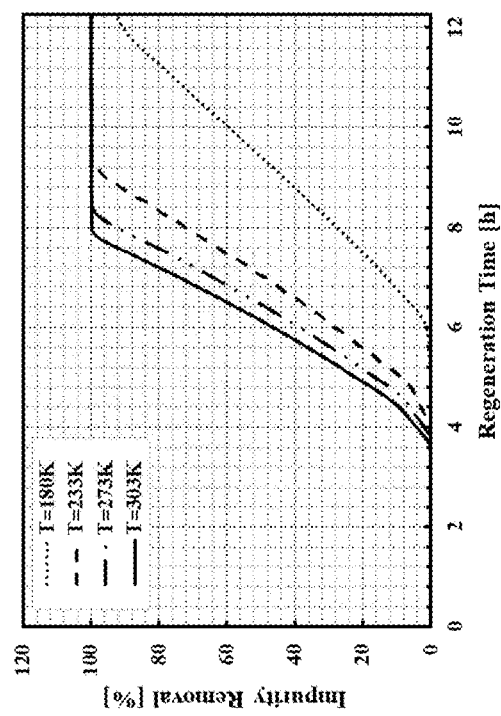
FIG. 24 is a plot of the percentage of impurities removed from a loaded adsorber as a function of time for different regeneration temperatures.

Example 6 explores the effect of temperature on regeneration of the CTSA. The regeneration cycle of Example 3 is used with varying temperatures for the 18 h regeneration gas step. FIG. 24 shows the percentage of impurities removed from the loaded adsorber 130B as a function of time for four regeneration temperatures. Ambient temperatures such as 303 K remove impurities the fastest, allowing a quicker switch to the cooling cycle. The cooling cycle may also be started before the loaded adsorber 130B reaches thermal equilibrium with the ambient temperature regeneration gas 138. Total regeneration time may therefore be reduced with ambient temperature (273-323 K) regeneration gas compared to lower temperatures (180-233 K) seen in the prior art.

Example 7

A computer simulation of the process of FIG. 8 was carried out using Aspen Plus® process simulation software, available from Aspen Technology Inc. A low-pressure crude hydrogen stream 802 is recovered from an industrial process at near ambient temperature and pressure with a composition of 50% H2 and 50% N2 by volume and is compressed in compressor 805 to 150 psig. The crude hydrogen stream 804 is then purified in RCPSA 110 resulting in a hydrogen feed stream 112 with between 500 and 1000 ppm N2 with balance H2. The hydrogen feed stream 112 is cooled to 80 K in heat exchanger 120 and combined with liquid hydrogen stream 861 to further reduce the temperature to between 50 and 80 K. Most of the remaining N2 impurities are removed in onstream adsorber 130A such that when the pure hydrogen stream 136 is combined with the hydrogen vapor 866, the final hydrogen product stream 836 has less than 1 ppb impurities.

Example 8

The effect of a nitrogen rinse on the hydrogen enrichment system 110 is shown in this example. The process is identical to Example 7 with the addition of a pure nitrogen rinse stream 115 to the rinse step of the RCPSA cycle at the same 150 psig pressure as the crude hydrogen feed. The hydrogen recovery in the RCPSA is increased from 70% without a rinse step to 95% with a rinse step.

Example 9

A computer simulation of the process of FIG. 9 was carried out using Aspen Plus software. The conditions of low-pressure crude hydrogen stream 902 and processing steps initial compression in 905, purification by RCPSA in 110, and cooling in first heat exchanger 420 are identical to Example 7. In online adsorber 430A the cooled hydrogen feed stream 422 is purified to a lesser extent to 45 ppb N2 in H2. Pure hydrogen stream 432 is further cooled to 32 K in second heat exchanger 450 and contacted with liquid hydrogen wash stream 446 in cryogenic wash column 440. The liquid hydrogen wash stream 446 comprises 10 ppb N2 and the ultra-pure hydrogen product 436 comprises less than 0.1 ppb N2.

Example 10

A computer simulation of the process of FIG. 7 was carried out using Aspen Plus software. The crude hydrogen stream 102 is a recycled process stream with 50% H2 and 50% N2 by volume at 150 psig which is purified in RCPSA 110 resulting in a hydrogen feed stream 112 with between 500 and 1000 ppm N2 with the balance H2, and a tail gas stream 113 with 80% N2 and 20% H2 by volume. The hydrogen recovery of the RCPSA 110 is 75%. The tail gas stream 113 is compressed from 4 psig to 150 psig in compressor 715, then separated in tail gas separator 780 to produce a hydrogen-enriched tail gas stream 781 comprising about 300 ppm impurities and a hydrogen-depleted tail gas stream 784 comprising about 98% N2 and 2% H2. The tail gas separator 780 is an ECS unit with a hydrogen recovery of 92%. The hydrogen-enriched tail gas stream 781 is combined with hydrogen feed stream 112 and cooled to 80 K and purified to 1 ppb impurities in online adsorber 130A as in Example 7. The ECS unit significantly reduces hydrogen losses by recovering hydrogen that would otherwise be lost in the tail gas stream 113.

Example 11

A computer simulation of the process of FIG. 8 was carried out using Aspen Plus software. As in Example 7, a low-pressure crude hydrogen stream 802 is recovered from an industrial process at near ambient temperature and pressure with a composition of 50% H2 and 50% N2 by volume and is compressed in compressor 805 to 150 psig. However, the hydrogen enrichment system 110 in Example 11 is an ECS unit that produces a hydrogen feed stream 112 with between 500 and 1000 ppm N2 with balance H2 and a tail gas stream 113 with 95% N2 and 5% H2 by volume. The remainder of the process is the same as Example 7, but offers a higher overall process recovery due to the hydrogen recovery of 95% in the ECS unit compared to 75% for a RCPSA.

Example 12

A computer simulation of the process of FIG. 8 was carried out using Aspen Plus software. The process is similar to Example 10, but the tail gas separator 780 is a single-stage membrane configured to permeate a hydrogen-enriched tail gas stream 781 to 3 psig which is recompressed in compressor 725 to 150 psig and returned to the crude hydrogen stream 102. In the case where the crude hydrogen stream 102 is produced by compressing a low-pressure stream to 150 psig the tail gas separator membrane peremeate pressure may be set to match the low-pressure stream so that the hydrogen-enriched tail gas stream 781 and the low-pressure stream may be combined prior to compression to 150 psig. The hydrogen recovery of the single-stage membrane is 85%, significantly improving overall hydrogen recovery by reducing the amount of hydrogen that would otherwise be lost in the tail gas stream 113.

Example 13

Table 1 below shows experimental results for the oxygen capacity in terms of weight percent for a series of adsorbents used as a TSA getter in the hydrogen enrichment system 1710 in FIG. 17A. Each adsorbent was regenerated with a mixture of 4% w/w hydrogen in bulk nitrogen, then monitored for weight uptake at 35° C. under a 4% w/w hydrogen in bulk nitrogen to measure hydrogen capacity, then under a 2% w/w hydrogen and 2% w/w oxygen in bulk nitrogen to measure oxygen capacity. As can be seen, all samples had no hydrogen uptake but significant oxygen uptake. Water was not observed coming off the adsorbent during oxygen uptake, indicating no reaction between hydrogen and oxygen at 35° C.

Caskey et al. (U.S. Pat. No. 10,450,244) teaches the removal of trace oxygen from bulk hydrogen using manganese oxides because copper oxides are known to react with hydrogen to form water and elemental copper at ambient temperatures. Russell et al. (US 2020/0270130) teaches the use of a copper oxide based adsorbent in an ambient-temperature PSA process to remove trace oxygen from bulk hydrogen, but requires a downstream adsorbent to remove water formed by reaction of copper oxide with hydrogen. Copper oxide containing materials were fully regenerated at between 170° C. and 200° C., whereas manganese oxide samples required much higher temperatures to achieve their highest oxygen capacities. While the lower regeneration temperature for the copper oxide containing materials is desirable, the very high regeneration temperature required for maganese oxide likely means that any trace reaction between hydrogen and oxygen at ambient temperatures will be minimized on the latter. One possible explanation for the lack of water formation with copper oxide-containing adsorbents in the experiments described in Table 1 is that regeneration under a reducing, hydrogen-containing, atmosphere reduces the copper oxide from the CuO to $Cu_2O$, or from the Cu(II) oxidation state to the Cu(I) oxidation state. The copper oxide that reacted with hydrogen at ambient temperatures in the prior art may have been in the CuO state, while the copper oxide that did not react with hydrogen to form water in the present experiments may have been in the $Cu_2O$ state.

The highest oxygen capacities and lowest regeneration temperatures were observed for mixed copper oxide and manganese oxide materials with a copper oxide to manganese oxide molar ratio of 1 CuO to 1 MnO2, though molar ratios from 0.5 to 10 are also effective. Failure to fully dry the equimolar CuO:MnO2 samples prior to the first hydrogen regeneration resulted in >75% loss in oxygen capacity.

TABLE 1

| Adsorbent | Regeneration temperature (° C.) | $H_2$ capacity (wt. %) | $O_2$ capacity (wt. %) |
|---|---|---|---|
| 40 wt % CuO on $MgSiCO_2$ | 170 to 200 | 0 | 0.9 |
| 1CuO:1 $MnO_2$ | 170 to 200 | 0 | 2.3 |
| $MnO_x$ | 200 | 0 | 0.1 |
| $MnO_x$ | 300 | 0 | 0.7 |
| $MnO_x$ | 375 | 0 | 1.5 |

While the principles of the invention have been described above in connection with preferred embodiments, it is to be clearly understood that this description is made only by way of example and not as a limitation of the scope of the invention.

The invention claimed is:

1. A process for the purification of a hydrogen feed stream comprising hydrogen, oxygen, and one or more impurities selected from the group consisting of nitrogen, argon, methane, carbon monoxide, carbon dioxide, and water, the process comprising:
    cooling the hydrogen feed stream to produce a cooled hydrogen stream;
    combining a liquid hydrogen stream with the cooled hydrogen stream to produce a combined cooled hydrogen stream;
    passing the combined cooled hydrogen stream through an online adsorber at a temperature below 80 K to adsorb the one or more impurities and produce a pure hydrogen stream and a loaded adsorber; and
    passing an inert regeneration gas stream through the loaded adsorber at a temperature between 0° C. and 50° C. and pressure to regenerate the loaded adsorber and produce a spent regeneration gas stream enriched in oxygen.

2. The process of claim 1, wherein the pure hydrogen stream is depleted in argon and oxygen relative to the hydrogen feed stream.

3. A process for the purification of a hydrogen feed stream comprising hydrogen, oxygen, and one or more impurities selected from the group consisting of nitrogen, argon, methane, carbon monoxide, carbon dioxide, and water, the process comprising:
    cooling the hydrogen feed stream to produce a cooled hydrogen stream;
    passing the cooled hydrogen stream through an online adsorber at a temperature below 80 K to adsorb the one or more impurities and produce a pure hydrogen stream and a loaded adsorber;
    passing an inert regeneration gas stream through the loaded adsorber at a temperature between 0° C. and 50° C. and pressure to regenerate the loaded adsorber and produce a spent regeneration gas stream enriched in oxygen; and
    separating a crude hydrogen stream by an adsorption process using a plurality of adsorbent beds to produce the hydrogen feed stream and an impurities-enriched hydrogen-depleted tail gas stream,
    wherein the adsorption process comprises a countercurrent purge step during which a purge gas is introduced to remove one or more crude impurities selected from nitrogen, argon, methane, carbon monoxide, carbon dioxide, and water, from the plurality of adsorbent beds; and
    wherein the purge gas comprises at least a portion of the spent regeneration gas stream.

4. The process of claim 3, wherein the adsorption process comprises a depressurization step during which a hydrogen-rich tail gas fraction is removed from the plurality of adsorbent beds; further comprising
    combining the hydrogen-rich tail gas fraction with the crude hydrogen stream.

5. The process of claim 4, wherein a hydrogen content of the hydrogen-rich tail gas stream is greater than 20% by volume.

6. The process of claim 3, further comprising separating the impurities-enriched tail gas stream to produce a hydrogen-enriched tail gas fraction and a hydrogen-depleted tail gas fraction; and combining the hydrogen-enriched tail gas fraction with one or more of the crude hydrogen stream and the hydrogen feed stream.

\* \* \* \* \*